US012500352B2

(12) United States Patent
Franzini et al.

(10) Patent No.: US 12,500,352 B2
(45) **Date of Patent: *Dec. 16, 2025**

(54) LOW-PROFILE, WIDEBAND ELECTRONICALLY SCANNED ARRAY FOR INTEGRATED GEO-LOCATION, COMMUNICATIONS, AND RADAR

(71) Applicant: The MITRE Corporation, McLean, VA (US)

(72) Inventors: Cecelia Franzini, Worcester, MA (US); Mohamed Wajih Elsallal, Acton, MA (US); Jamie Hood, Owatonna, MN (US)

(73) Assignee: The MITRE Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,275

(22) Filed: Jun. 3, 2024

(65) Prior Publication Data

US 2024/0322454 A1 Sep. 26, 2024

Related U.S. Application Data

(60) Continuation of application No. 17/071,789, filed on Oct. 15, 2020, now Pat. No. 12,003,030, which is a (Continued)

(51) Int. Cl.

*H01Q 21/22* (2006.01)
*H01Q 3/34* (2006.01)

(Continued)

(52) U.S. Cl.

CPC ............... *H01Q 21/22* (2013.01); *H01Q 3/34* (2013.01); *H01Q 5/50* (2015.01); *H01Q 9/28* (2013.01);

(Continued)

(58) Field of Classification Search

CPC ............ H01Q 21/22; H01Q 3/34; H01Q 5/50; H01Q 9/28; H01Q 21/062; H01Q 21/26; H01R 13/2414; H01R 2201/02

See application file for complete search history.

(56) References Cited

U.S. PATENT DOCUMENTS

| | | | |
|---|---|---|---|
| 4,574,331 | A | 3/1986 | Smolley |
| 5,187,489 | A | 2/1993 | Whelan et al. |

(Continued)

FOREIGN PATENT DOCUMENTS

| | | | |
|---|---|---|---|
| EP | 2629367 | A1 | 8/2013 |
| KR | 10-2016-0072358 | A | 6/2016 |

(Continued)

OTHER PUBLICATIONS

Boryssenko, Anatoliy et al., "Substrate Free G-Band Vivaldi Antenna Array Design, Fabrication and Testing," 39th International Conference on Infrared, Millimeter, and Terahertz Waves (IRMMW-THz), Sep. 2014, 2 pages.

(Continued)

*Primary Examiner* — Seung H Lee
(74) *Attorney, Agent, or Firm* — Morrison & Foerster LLP

(57) ABSTRACT

An antenna element including a base plate, a first ground clustered pillar projecting from the base plate, a second ground clustered pillar projecting from the base plate and spaced apart from a first side of the first ground clustered pillar is provided. The ground clustered pillars, the signal ears, and the ground ears can be shapes so that the capacitive coupling between the ears and the pillars is sufficient to allow them to be spaced further apart, thereby reducing the number of elements required in the phased array. In some embodiments, the ground ear can be directly machined with the base plate thereby obviating the need for the ground ear to be overmolded into the base plate with the signal ear. In (Continued)

other embodiments the phased array antenna can utilize elastomeric connectors to further improve the mechanical and electrical reliability of the connections of the phase array antenna.

15 Claims, 19 Drawing Sheets

Related U.S. Application Data division of application No. 15/708,035, filed on Sep. 18, 2017, now Pat. No. 10,854,993.

(51) Int. Cl.
*H01Q 5/50* (2015.01)
*H01Q 9/28* (2006.01)
*H01Q 21/06* (2006.01)
*H01Q 21/26* (2006.01)
*H01R 13/24* (2006.01)

(52) U.S. Cl.
CPC ........... *H01Q 21/062* (2013.01); *H01Q 21/26* (2013.01); *H01R 13/2414* (2013.01); *H01R 2201/02* (2013.01)

(56) References Cited

U.S. PATENT DOCUMENTS 5,309,165 A 5/1994 Segal et al.
5,557,291 A 9/1996 Chu et al.
5,845,391 A 12/1998 Bellus et al.
5,886,671 A 3/1999 Riemer et al.
5,923,289 A 7/1999 Buer et al.
5,945,897 A 8/1999 Pluymers et al.
5,982,250 A 11/1999 Hung et al.
6,020,848 A 2/2000 Wallace et al.
6,297,774 B1 10/2001 Chung
6,300,906 B1 10/2001 Rawnick et al.
6,424,313 B1 7/2002 Navarro et al.
6,480,154 B1 11/2002 Bella et al.
6,529,166 B2 3/2003 Kanamaluru
6,531,976 B1 3/2003 Yu
6,552,687 B1 4/2003 Rawnick et al.
6,552,691 B2 4/2003 Mohuchy et al.
6,758,681 B2 7/2004 Johnson, Jr.
6,771,221 B2 8/2004 Rawnick et al.
6,822,616 B2 11/2004 Durham et al.
6,856,297 B1 2/2005 Durham et al.
6,876,336 B2 4/2005 Croswell et al.
7,009,570 B2 3/2006 Durham et al.
7,034,753 B1 4/2006 Elsallal et al.
7,088,300 B2 8/2006 Fisher
7,109,939 B2 9/2006 Lynch et al.
7,180,457 B2 2/2007 Trott et al.
7,260,141 B2 8/2007 Bierly et al.
7,369,083 B2 5/2008 Budic
7,373,127 B2 5/2008 Reed
7,385,914 B2 6/2008 Choi et al.
7,394,424 B1 7/2008 Jelinek et al.
7,403,169 B2 7/2008 Svensson et al.
7,408,520 B2 8/2008 Durham et al.
7,474,262 B2 1/2009 Alland
7,714,782 B2 5/2010 Davis et al.
7,760,142 B2 7/2010 Sabet et al.
8,081,123 B2 12/2011 Yang
8,154,469 B2 4/2012 McKinley et al.
8,305,283 B2 11/2012 Bourtoutian
8,325,093 B2 12/2012 Holland et al.
8,350,773 B1 1/2013 Kindt
8,405,564 B2 3/2013 Kindt et al.
8,466,846 B1 6/2013 Elsallal et al.
8,482,475 B2 7/2013 Tiezzi et al.
8,547,275 B2 10/2013 Culkin et al.
8,643,554 B1 2/2014 Manry, Jr. et al.
8,665,845 B2 3/2014 O'Keeffe et al.
8,736,504 B1 5/2014 West et al.
8,749,446 B2 6/2014 Manry, Jr. et al.
8,754,810 B2 6/2014 Guo et al.
8,847,836 B2 9/2014 Yu et al.
8,872,719 B2 10/2014 Warnick
8,941,540 B2 1/2015 Harper et al.
8,947,312 B2 2/2015 Brown et al.
8,988,278 B2 3/2015 Lee et al.
9,000,996 B2 4/2015 Holland et al.
9,070,972 B2 6/2015 Wang et al.
9,190,727 B1 11/2015 Urcia et al.
9,445,282 B2 9/2016 Chen et al.
9,520,655 B2 12/2016 Cerreno
9,912,072 B1 3/2018 Mandeville et al.
10,680,323 B2 * 6/2020 Zhang .................... H01Q 21/30
10,854,993 B2 12/2020 Franzini et al.
11,088,465 B2 8/2021 Elsallal
12,003,030 B2 * 6/2024 Franzini .................. H01Q 3/34
2005/0035915 A1 2/2005 Livingston et al.
2008/0012710 A1 1/2008 Sadr
2008/0211726 A1 9/2008 Elsallal et al.
2009/0239551 A1 9/2009 Woodsum
2010/0007572 A1 1/2010 Jones et al.
2010/0154250 A1 6/2010 Bae et al.
2010/0277385 A1 11/2010 Lewis et al.
2011/0057852 A1 3/2011 Holland et al.
2012/0025370 A1 2/2012 Wholey et al.
2012/0194406 A1 8/2012 Brown et al.
2013/0016003 A1 1/2013 Stirling-Gallacher et al.
2013/0207878 A1 8/2013 Mital et al.
2013/0342397 A1 12/2013 Turbiner
2014/0138546 A1 5/2014 Iluz et al.
2014/0152510 A1 6/2014 Manry, Jr. et al.
2014/0266897 A1 9/2014 Jakoby et al.
2014/0327576 A1 11/2014 Kumar
2015/0295309 A1 10/2015 Manry, Jr. et al.
2015/0364819 A1 12/2015 Ngo et al.
2016/0087111 A1 3/2016 Toonen et al.
2016/0164587 A1 6/2016 Pu et al.
2016/0241323 A1 8/2016 Ko et al.
2017/0025767 A1 1/2017 Elsallal et al.
2017/0237177 A1 8/2017 Kirino et al.
2017/0256859 A1 9/2017 Boryssenko et al.
2017/0302003 A1 10/2017 Elsallal et al.
2018/0269592 A1 9/2018 Elsallal et al.
2018/0269593 A1 9/2018 Elsallal et al.
2018/0366836 A1 12/2018 Elsallal et al.
2018/0375217 A1 12/2018 Elsallal et al.
2020/0076090 A1 3/2020 Franzini et al.
2020/0212041 A1 7/2020 Machkaoutsan et al.
2021/0028557 A1 1/2021 Franzini
2021/0036736 A1 2/2021 Uchimura et al.
2021/0111498 A1 4/2021 Franzini et al.
2021/0376484 A1 12/2021 Elsallal et al.
2024/0332818 A1 10/2024 Franzini

FOREIGN PATENT DOCUMENTS

WO 1999/34477 A1 7/1999
WO 2001/89030 A1 11/2001
WO 2015/019100 A1 2/2015
WO 2015/104728 A1 7/2015

OTHER PUBLICATIONS

Elsallalet al. U.S. Office Action dated Oct. 26, 2017, directed to U.S. Appl. No. 14/544,935; 7 pages.
Elsallal et al. U.S. Office Action mailed Sep. 8, 2017, directed to U.S. Appl. No. 14/544,934; 6 pages.
elsallalet al., U.S. Office Action dated Jul. 13, 2018, directed to U.S. Appl. No. 15/986,464; 6 pages.
Elsallal et al., U.S. Office Action dated Jul. 17, 2018, directed to U.S. Appl. No. 15/986,413; 9 pages.
Elsallal et al., U.S. Office Action dated Jun. 18, 2020 directed to U.S. Appl. No. 16/057,709; 8 pages.

(56) References Cited

OTHER PUBLICATIONS

Elsallal et al., U.S. Office Action dated Jun. 19, 2020 directed to U.S. Appl. No. 16/057,672; 9 pages.
Elsallal et al., U.S. Office Action dated Nov. 15, 2024 directed to U.S. Appl. No. 17/397,519; 11 pages.
Elsallal et al., U.S. Office Action dated Nov. 17, 2020 directed to U.S. Appl. No. 16/057,672; 9 pages.
Elsallal et al., U.S. Office Action dated Nov. 18, 2020 directed to U.S. Appl. No. 16/057,709; 8 pages.
Fenn, Alan J. et al., "The Development of Phased-Array Radar Technology," Lincoln Laboratory Journal, vol. 12, No. 2, (2000), pp. 321-340.
Franzini et al., U.S. Office Action dated Aug. 17, 2022, directed to U.S. Appl. No. 17/113,639; 13 pages.
Franzini et al., U.S. Office Action dated Feb. 21, 2020, directed to U.S. Appl. No. 15/708,035; 9 pages.
Franzini et al., U.S. Office Action dated Mar. 18, 2020, directed to U.S. Appl. No. 16/115,306; 18 pages.
Franzini et al., U.S. Office Action dated Oct. 29, 2019, directed to U.S. Appl. No. 15/708,035; 30 pages.
Galli, A. et al., "Novel Printed UWB Array Based on a Versatile and Low-Cost Antenna Configuration," 6th European Conference on Antennas and Propagation, IEEE, 2011, pp. 626-628.
Holland, Steven S. et al., "A 7-21 GHZ Dual-Polarized Planar Ultrawideband Modular Antenna (PUMA) Array," IEEE Transactions on Antennas and Propagation, vol. 60, No. 10, Oct. 2012, pp. 4589-4600.
International Preliminary Report on Patentability dated Mar. 24, 2020, directed to International Application No. PCT/US2018/051591; 9 pages.
International Search Report and Written Opinion mailed Dec. 14, 2018, directed to PCT Application No. PCT/US2018/051591; 16 pages.
Jamil, K. et al. (2012) "A Multi-Band Multi-Beam Software-Defined Passive Radar Part I: System Design," IET International Conference on Radar Systems (Radar 2012); 5 pages.
Moulder, William F. et al., "Ultrawideband Superstrate-Enhanced Substrate-Loaded Array With Integrated Feed," IEEE Transactions on Antennas and Propagation, vol. 61, No. 11, Nov. 2013, pp. 5802-5807.
Odile, Adrian (2008) "From AESA radar to digital radar for surface applications," IET, Waveform Diversity & Digital Radar Conference—Day 2: From Active Modules to Digital Radar, retrieved at http://ieeexplore.ieee.org/document/4782200/?arnumber=4782200, abstract only; 1 page.
Shen, W. et al., "Study on Asymmetric Tapered Slotline Antenna," IEEE 2006, pp. 156-158.
Tallini, D. et al., "A New Low-Profile Wide-Scan Phased Array for UWB Applications," 2007; 5 pages.
Volakis, John L. et al. (2014) "Ultra-wideband conformal apertures with digital beamforming for UHF to millimeter-wave applications," IEEE International Workshop on Antenna Technology: Small Antennas, Novel EM Structures and Materials, and Applications (iWAT); retrieved at http://ieeexplore.ieee.org/document/6958622, abstract only; 1 page.
Yao, Yuan et al. (2008) "Ultra-wideband Antenna Array Using Novel Asymmetric Tapered Slot Radiator," IEEE; 4 pages.
Yi, Huan et al. "3-D Printed Discrete Dielectric Lens Antenna with Matching Layer," Proceedings of ISAP 2014, Kaohsiung, Taiwan, Dec. 2, 2014, pp. 115-116.
Zhao, Yun et al., (2014) "Wideband and Low-Profile H-Plane Ridged SIW Horn Antenna Mounted on a Large Conducting Plane," IEEE Transactions on Antennas and Propagation vol. 62, Issue 11, retrieved at http://ieeexplore.ieee.org/document/6891293, abstract only; 1 page.

* cited by examiner

SCAN-IMPEDANCE

| | BS | XZ45 | YZ45 |
|---|---|---|---|
| AVERAGE | 1.72 | 1.72 | 2.29 |

LOW-PROFILE, WIDEBAND ELECTRONICALLY SCANNED ARRAY FOR INTEGRATED GEO-LOCATION, COMMUNICATIONS, AND RADAR

CROSS-REFERENCE TO RELATED APPLICATION

This application is a continuation of U.S. application Ser. No. 17/071,789, filed Oct. 15, 2020, which is a divisional of U.S. application Ser. No. 15/708,035, filed Sep. 18, 2017, the entire contents of each of which are incorporated herein by reference.

FIELD OF THE DISCLOSURE

The present disclosure relates generally to antennas, and more specifically to ultra-wideband, multi-band, phased array or electronically scanned array antennas.

BACKGROUND OF THE DISCLOSURE

There are increasing demands to develop a wideband phased array or electronically scanned array (ESA) that include a wide variety of configurations for various applications, such as satellite communications (SATCOM), radar, remote sensing, direction finding, and other systems. The goal is to provide more flexibility and functionality at reduced cost with consideration to limited space, weight, and power consumption (SWaP) on modern military and commercial platforms. This requires advances in ESA and manufacturing technologies.

A phased array antenna is an array of antenna elements in which the phases of respective signals feeding the antenna elements are set in such a way that the effective radiation pattern of the array is reinforced in a desired direction and suppressed in undesired directions, thus forming a beam. The relative amplitudes of constructive and destructive interference effects among the signals radiated by the individual elements determine the effective radiation pattern of the phased array. The number of antenna elements in a phased array antenna is often dependent on the required gain of a particular application and can range from isotropic to highly directive level.

Phased array antennas for ultra-wide bandwidth (more than one octave bandwidth) performance are often large, causing excessive size, weight, and cost for applications requiring many elements. The excessive size of an array may be required to accommodate “electrically large” radiating elements (several wavelengths in length), increasing the total depth of the array. Arrays may also be large due to the nesting of several multi-band elements to enable instantaneous ultra-wide bandwidth performance, which increases the total length and width of the array.

Phased arrays antennas have several primary performance characteristics in addition to the minimization of grating lobes, including bandwidth, scan volume, and polarization. Grating lobes are secondary areas of high transmission/reception sensitivity that appear along with the main beam of the phased array antenna. Grating lobes negatively impact a phased array antenna by dividing transmitted/received power into a main beam and false beams, creating ambiguous directional information relative to the main beam and generally limiting the beam steering performance of the antenna. Bandwidth is the frequency range over which an antenna provides useful match and gain. Scan volume refers to the range of angles, beginning at broadside (normal to the array plane) over which phasing of the relative element excitations can steer the beam without generating grating lobes. Polarization refers to the orientation or alignment of the electric field radiated by the array. Polarization may be linear (a fixed orientation), circular (a specific superposition of polarizations), and other states in between.

Phased array antenna design parameters such as antenna element size and spacing affect these performance characteristics, but the optimization of the parameters for the maximization of one characteristic may negatively impact another. For example, maximum scan volume (maximum set of grating lobe-free beam steering angles) may be set by the antenna element spacing relative to the wavelength at the high end of the frequency spectrum. Once cell spacing is determined, a desired minimum frequency can be achieved (maximizing bandwidth) by increasing the antenna element length to allow for impedance matching. However, increased element length may negatively influence polarization and scan volume. The scan volume can be increased through closer spacing of the antenna elements, but closer spacing can increase undesirable coupling between elements, thereby degrading performance. This undesirable coupling can change rapidly as the frequency varies, making it difficult to maintain a wide bandwidth.

Existing wide bandwidth phased array antenna elements are often large and require contiguous electrical and mechanical connections between adjacent elements (such as the traditional Vivaldi). In the last few years, there have been several new low-profile wideband phased array solutions, but many suffer from significant limitations. For example, planar interleaved spiral arrays are limited to circular polarization. Tightly coupled printed dipoles require superstrate materials to match the array at wide-scan angles, which adds height, weight, and cost. The Balanced Antipodal Vivaldi Antenna (BAVA) uses a mix of metallic posts and printed circuit substrate to operate over wideband frequencies but may not be suitable for high power-application because it is limited by the substrate material power handling capability. Furthermore, the BAVA requires connectors to deliver the signal from the front-end electronics to the aperture.

Existing designs often have not been able to maximize phased array antenna performance characteristics such as bandwidth, scan volume, and polarization without sacrificing size, weight, cost, and/or manufacturability. Accordingly, there is a need for a phased array antenna with wide bandwidth, wide scan volume, and good polarization, in a low cost, lightweight, small footprint (small aperture) design that can be scaled for different applications.

SUMMARY OF THE DISCLOSURE

A phased array antenna that is configured to provide enhanced coupling between adjacent elements so as to allow for relaxed lattice spacing, while at the same time providing a wide-bandwidth, wide scan-volume, and good polarization is provided. The phased array can include a plurality of clustered pillars and radiating elements whose shape is configured to allow for increased coupling between adjacent elements, thereby allowing for a relaxed lattice spacing in the array.

In additional embodiments, the phased array antenna can be further improved by being configured to only require overmolding of a signal ear of the radiating elements thereby reducing the mechanical complexity of the array, and reducing the number of locations for possible mechanical failure as well as reducing the number of locations for electrical discontinuity between elements of the array.

In additional embodiments, the phased array antenna can be further improved by designing the elements of the phased array to mate with a coaxial cable and PCB circuit thereby providing more flexibility to test the aperture using only coaxial cables or to excite the entire array using a PCB combiner. In some embodiments, the phased array can also be improved by providing designing the elements of the phased array to mate with a plurality of Subminiature Version A (SMA) connectors.

DETAILED DESCRIPTION OF THE INVENTION

Figure 1B:
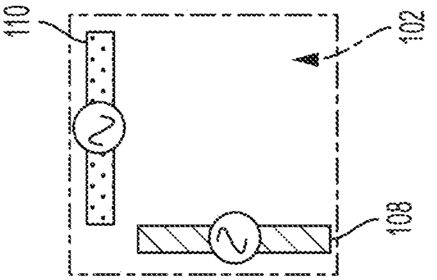
FIG. 1B illustrates a unit cell of the general dual-polarized phased array antenna depicted in FIG. 1A according to certain embodiments.

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Reference is sometimes made herein to an array antenna having a particular configuration (e.g. a planar array). One of ordinary skill in the art would appreciate that the techniques described herein are applicable to various sizes and shapes of array antennas. It should thus be noted that although the description provided herein describes the concepts in the context of a rectangular array antenna, those of ordinary skill in the art would appreciate that the concepts equally apply to other sizes and shapes of array antennas including, but not limited to, arbitrary shaped planar array antennas as well as cylindrical, conical, spherical and arbitrary shaped conformal array antennas.

Reference is also made herein to the array antenna including radiating elements of a particular size and shape. For example, certain embodiments of radiating element are described having a shape and a size compatible with operation over a particular frequency range (e.g. 2-30 GHz). Those of ordinary skill in the art would recognize that other shapes of antenna elements may also be used and that the size of one or more radiating elements may be selected for operation over any frequency range in the RF frequency range (e.g. any frequency in the range from below 20 MHz to above 50 GHz).

Reference is sometimes made herein to generation of an antenna beam having a particular shape or beamwidth. Those of ordinary skill in the art would appreciate that antenna beams having other shapes and widths may also be used and may be provided using known techniques such as by inclusion of amplitude and phase adjustment circuits into appropriate locations in an antenna feed circuit.

Described herein are embodiments of frequency-scaled ultra-wide spectrum phased array antennas. These phased array antennas are formed of repeating cells of frequency-scaled ultra-wide spectrum radiating elements. Phased array antennas according to certain embodiments exhibit very low profile, wide bandwidth, low cross-polarization, and high scan-volume while being low cost, small aperture, modular with built-in RF interconnect, and scalable.

A unit cell of a frequency-scaled ultra-wide spectrum phased array antenna, according to certain embodiments, includes a pattern of radiating elements. According to certain embodiments, the radiating elements are formed of substrate-free, interlacing components that include a pair of metallic ears that form a coplanar transmission line. One of the ears is the ground component of the radiating element and can be terminated to the ground of a coaxial connector used for connecting a feed line or directly to the array's baseplate. The other ear is the signal or active line of the radiating element and can be connected to the center of a coaxial feed line. According to certain embodiments, the edge of the radiating elements (the edge of the ears) are shaped to encapsulate a cross-shape metallic clustered pillar, which controls the capacitive component of the antenna and can allow good impedance matching at the lower-frequency end of the bandwidth, effectively increasing the operational bandwidth. This has the advantage of a phased array antenna in which no wideband impedance matching network or special mitigation to a ground plane is needed. Radiating elements can be for transmit, receive, or both. Phased array antennas can be built as single polarized or dual polarized by implementing the appropriate radiating element pattern, as described below.

Figure 1A:
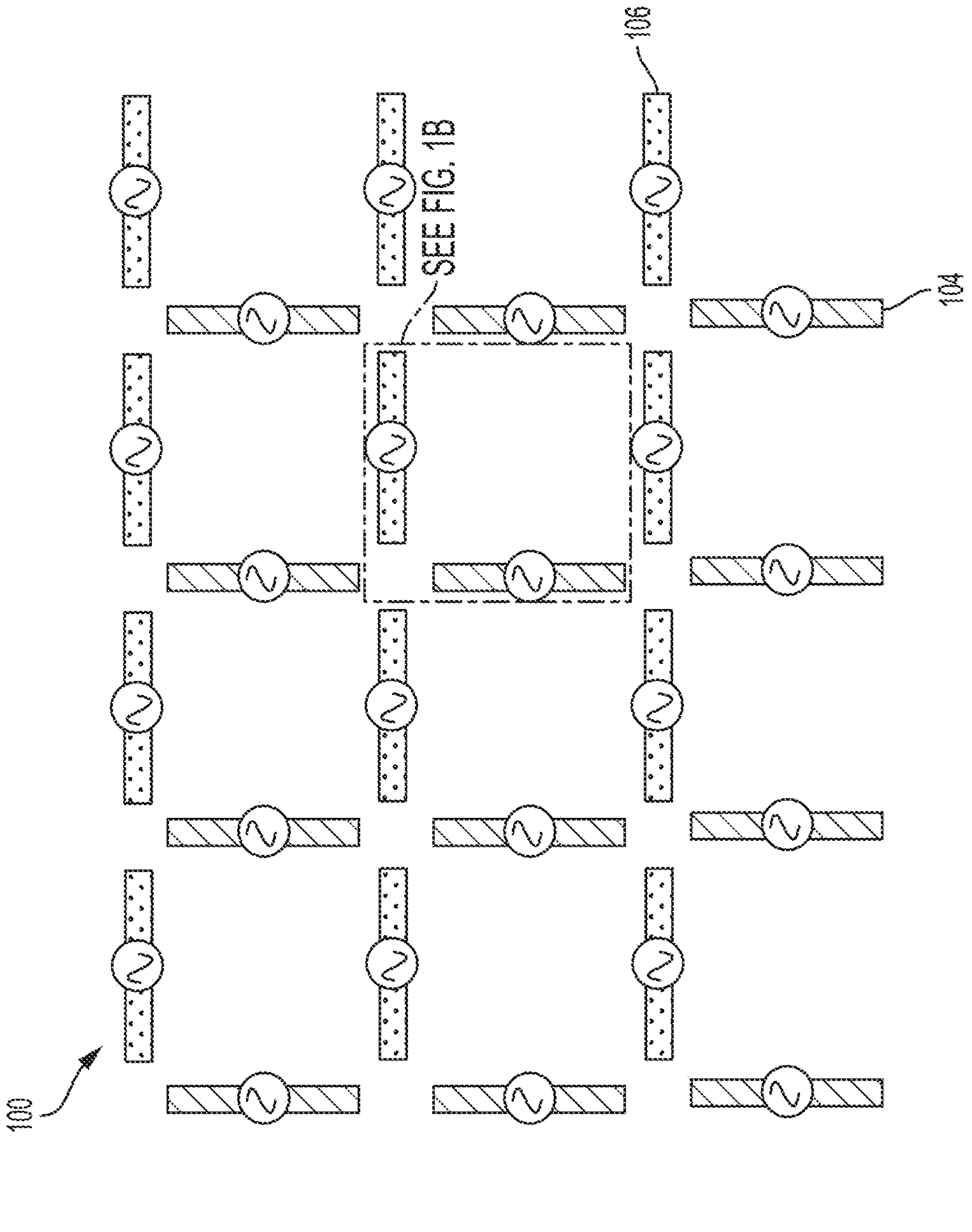
FIG. 1A is a plan view of a general dual-polarized phased array antenna according to certain embodiments.

FIG. 1A illustrates an antenna array of radiating elements 100 according to certain embodiments. FIG. 1B illustrates a unit cell of the general dual-polarized phased array antenna depicted in FIG. 1A according to certain embodiments. A dual polarized configuration is shown with radiating elements oriented both horizontally 106 and vertically 104. In this embodiment, a unit cell 102 includes a single horizontally polarized element 110 and a single vertically polarized element 108. Array 100 is a 4×3 array of unit cells 102. According to certain embodiments, array 100 can be scaled up or down to operate over a specified frequency range. More unit cells can be added to meet other specific design requirements such as antenna gain. According to certain embodiments, modular arrays of a predefined size may be combined into a desired configuration to create an antenna array to meet the required performance. For example, a module may include the 4×3 array of radiating elements 100 illustrated in FIGS. 1A and 1B. A particular antenna application requiring 96 radiating elements can be built using eight modules fitted together (thus, providing the 96 radiating elements). This modular design allows for antenna arrays to be tailored to specific design requirements at a lower cost.

As shown in FIGS. 1A and 1B, element 108 is disposed along a first axis and element 110 is disposed along a second axis that is orthogonal to the first axis, such that element 108 is substantially orthogonal to element 110. This orthogonal orientation results in each unit cell 102 being able to generate orthogonally directed electric field polarizations. That is, by disposing one set of elements (e.g. vertical elements 104) in one polarization direction and disposing a second set of elements (e.g. horizontal elements 106) in the orthogonal polarization direction, an antenna which can generate signals having any polarization is provided. In this particular example, unit cells 102 are disposed in a regular pattern, which here corresponds to a square grid pattern. Those of ordinary skill in the art would appreciate that unit cells 102 need not all be disposed in a regular pattern. In some applications, it may be desirable or necessary to dispose unit cells 102 in such a way that elements 108 and 110 of each unit cell 102 are not aligned between every unit cell 102. Thus, although shown as a square lattice of unit cells 102, it would be appreciated by those of ordinary skill in the art, that antenna 100 could include but is not limited to a rectangular or triangular lattice of unit cells 102 and that each of the unit cells can be rotated at different angles with respect to the lattice pattern.

Symmetric Phased Array

Figure 2C:
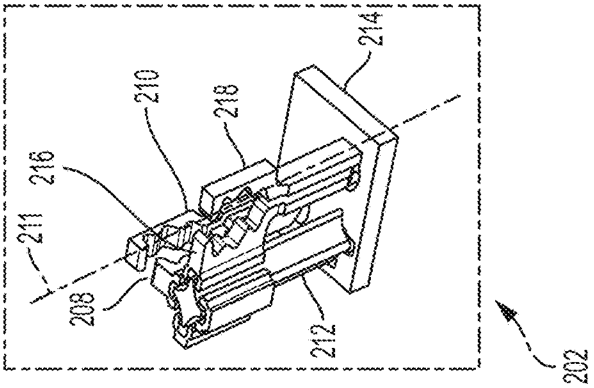
FIG. 2C is an isometric view of a unit cell of a dual-polarized phased array antenna according to certain embodiments.
Figure 2B:
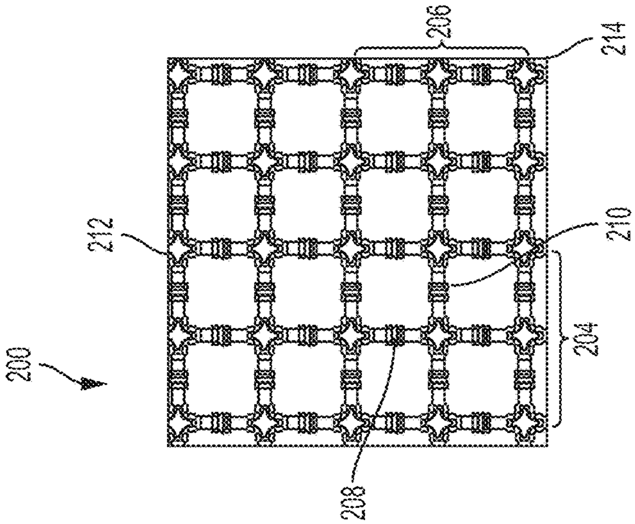
FIG. 2B is a top view of a dual-polarized phased array antenna according to certain embodiments.
Figure 2A:
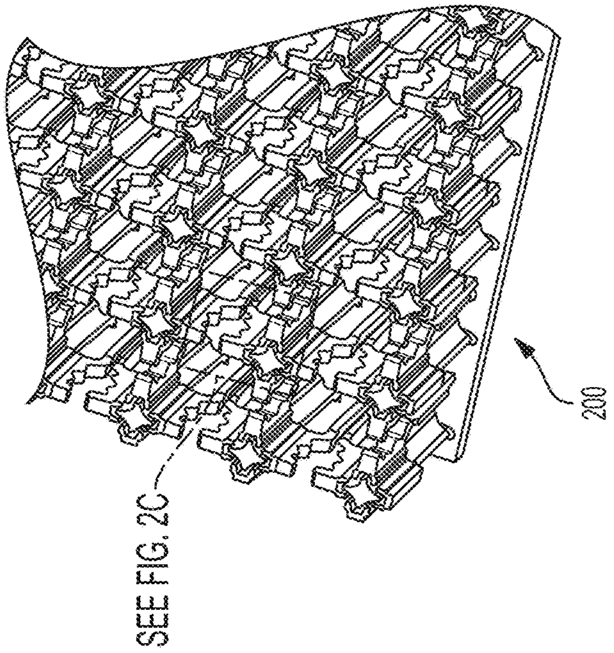
FIG. 2A is an isometric view of a dual-polarized phased array antenna according to certain embodiments.

An array of radiating elements 200 according to certain embodiments is illustrated in FIGS. 2A and 2B. Array 200 is a dual-polarized configuration with multiple columns of radiating elements 204 oriented along a first polarization axis (referred to herein as vertically polarized) and multiple rows of radiating elements 206 oriented along a second polarization axis (referred to herein as horizontally polarized) affixed to base plate 214. A unit cell 202 of array 200 is shown in detail in FIG. 2C. Unit cell 202 includes two radiating elements, a vertically polarized radiating element 208 and a horizontally polarized radiating element 210. Horizontally polarized radiating element 210 includes signal ear 216 and ground ear 218. A signal beam is generated by exciting radiating element 210, i.e. by generating a voltage differential between signal ear 216 and ground ear 218. The generated signal beam has a direction along the centerline 211 of radiating element 210, perpendicular to base plate 214. Centerline 211 is the phase center of radiating element 210. A signal beam generated by exciting radiating element 208, has a phase center midway between its respective signal and ground ear. As shown in the embodiments of FIGS. 2A-2C, the phase centers of radiating elements 204 are not co-located with the phase centers of radiating elements 206.

In the embodiments of FIG. 2, the radiating elements 204 are of the same size, shape, and spacing as radiating elements 206. However, phased array antennas according to other embodiments, may include only single polarized radiating elements (e.g., only rows of radiating elements 206). According to some embodiments, the spacing of one set of radiating elements (e.g., the horizontally polarized elements 206) is different from the spacing of the other set of radiating elements (e.g., the vertically polarized elements 204). According to some embodiments, the radiating element spacing within a row may not be uniform. For example, the spacing between first and second elements within a row may be different than the spacing between the second and third elements.

Figure 3C:
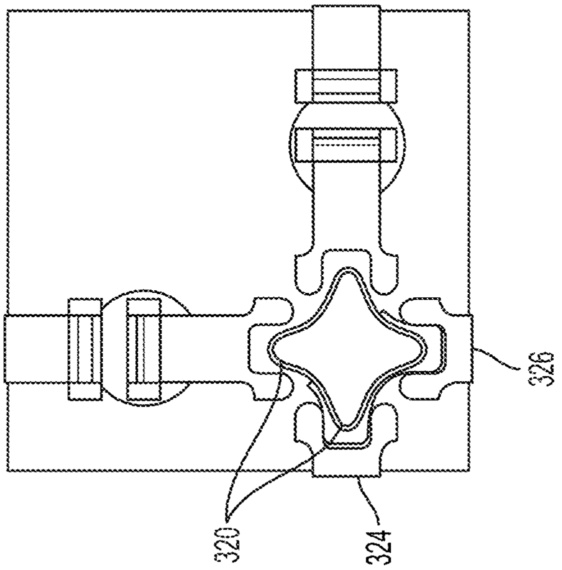
FIG. 3C is a top view of a unit cell of dual-polarized phased array antenna according to certain embodiments.
Figure 3B:
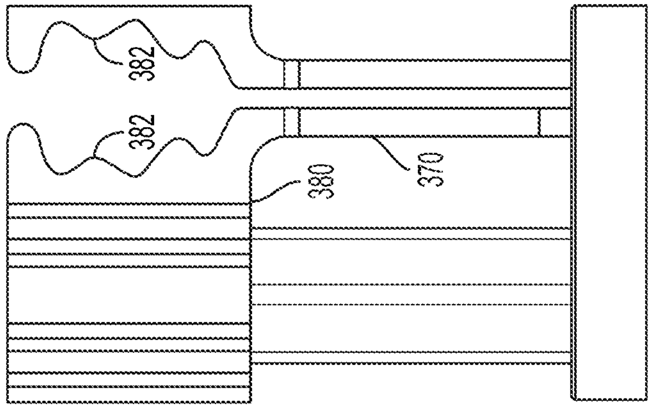
FIG. 3B is a side view of a unit cell of dual-polarized phased array antenna according to certain embodiments.
Figure 3A:
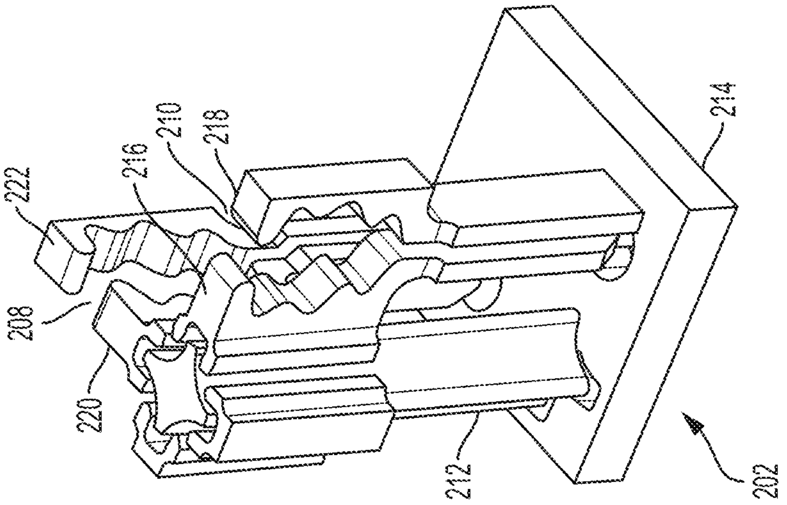
FIG. 3A is an isometric view of a unit cell of dual-polarized phased array antenna according to certain embodiments.

FIGS. 3A, 3B, and 3C provide enlarged views of unit cell 202 according to certain embodiments. Radiating element 208 includes signal ear 220 and ground ear 222. Clustered pillar 212 and ground ear 222 may be both electrically coupled to base plate 214 such that no (or minimal) electrical potential is generated between them during operation. Signal ear 220 is electrically isolated (insulated) from base plate 214, clustered pillar 212, and ground ear 222. According to certain embodiments, a second set of radiating elements 210 are disposed along a second, orthogonal axis. Radiating element 210 includes signal ear 216 and ground ear 218. Clustered pillar 212 and ground ear 218 may be both electrically coupled to base plate 214 such that no (or minimal) electrical potential is generated between them during operation. According to certain embodiments, clustered pillar 212 and ground ear 218 are not electrically connected to base plate 214 but instead to a separate ground circuit. Signal ear 216 is electrically isolated (insulated) from base plate 214, clustered pillar 212, and ground ear 218.

According to certain embodiments, the edges of the radiating elements (the edge of the ears) are shaped to encapsulate cross-shaped metallic clustered pillar 212 to capacitively couple adjacent radiating elements during operation. This can enhance the capacitive component of the antenna, which allows a good impedance match at the low-frequency end of the bandwidth. Through this coupling of clustered pillar 212, each radiating element in a row or column is electromagnetically coupled to ground and the previous and next radiating element in the row or column.

Capacitive coupling is achieved by maintaining a gap 320 between a radiating element ear and its adjacent clustered pillar, which creates interdigitated capacitance between the two opposing surfaces of gap 320. This capacitance can be used to improve the impedance matching of the antenna. Capacitive coupling can be controlled by changing the overlapped surface area of gap 320 and width of gap 320 (generally, higher capacitance is achieved with larger surface area and less width). According to certain embodiments, signal ears 220 and 216 and ground ears 222 and 218 wrap around the cross shape of clustered pillar 212 in order to maximize the surface area. However, other designs for maximizing the capacitive surface area are also contemplated. For example, a clustered pillar and adjacent ear can form interlacing fingers when viewed from above (e.g., the view of FIG. 3C) or interlacing fingers when viewed from the side (e.g., the view of FIG. 3B). According to certain embodiments, gap 320 is less than 0.1 inches, preferably less than 0.05 inches, and more preferably less than 0.01 inches. According to some embodiments, gap 320 may be scaled with frequency (for example, gap 320 may be a function of the wavelength of the highest designed frequency, $\lambda$). For example, according to some embodiments, gap 320 can be less than $0.05\lambda$, less than $0.025\lambda$, or less than $0.013\lambda$. According to some embodiments, gap 320 is greater than $0.005\lambda$, greater than $0.01\lambda$, greater than $0.025\lambda$, greater than $0.05\lambda$, or greater than $0.1\lambda$. As shown in FIG. 3B, according to certain embodiments, the radiating ears include stem portions 370 extending from base plate 214 to comb portions 380 that include a plurality of irregularly shaped projections 382. According to certain embodiments, gap 320 extends perpendicularly to base plate 214 (i.e., along the length of the clustered pillar/radiating element) in the same amount and location as comb portion 380.

Interdigitated capacitance enables some coupling between adjacent radiating elements in a row (or column). In other words, the electromagnetic field from a first radiating element communicates from its ground ear across the adjacent gap to the adjacent clustered pillar through the interdigitated capacitance and then across the opposite gap to the adjacent signal ear of the next radiating element. Referring to FIG. 3C, which shows a top view of unit cell 202, clustered pillar 212 is surrounded by four radiating element ears. On the right side is signal ear 216 of radiating element 210. On the left side is the ground ear 324 of the next radiating element along that axis. On the top side is signal ear 220 of radiating element 208. On the bottom side is the ground ear 326 of the next radiating element along that axis. Capacitive coupling between clustered pillar 212 and each ear 216 and 324 created by adjacent gaps 320 enable the electromagnetic field of radiating element 208 to couple to the electromagnetic field of the next radiating element (the radiating element of ground ear 324), and capacitive coupling between clustered pillar 212 and each ear 220 and 326 created by respective adjacent gaps 320 enable the electromagnetic field of radiating element 210 to couple to the electromagnetic field of the next radiating element (the radiating element that includes ground ear 326).

It should be understood that the illustrations of unit cell 202 in 2C, 3A, 3B, and 3C truncate ground ears 324 and 326 on the left and bottom side of clustered pillar 212 for illustrative purposes only. One of ordinary skill in the art would understand that the relative orientation of one set of radiating elements to an orthogonal set of radiating elements, as described herein, is readily modified, i.e. a signal ear could be on the left side of clustered pillar 212 with a ground ear being on the right side, and/or a signal ear could be on the bottom side of clustered pillar 212 with a ground ear being on the top side (relative to the view of FIG. 3C).

According to certain embodiments, base plate 214 is formed from one or more conductive materials, such as metals like aluminum, copper, gold, silver, beryllium copper, brass, and various steel alloys. According to certain embodiments, base plate 214 is formed from a non-conductive material such as various plastics, including Acrylonitrile butadiene styrene (ABS), Nylon, Polyamides (PA), Polybutylene terephthalate (PBT), Polycarbonates (PC), Polyetheretherketone (PEEK), Polyetherketone (PEK), Polyethylene terephthalate (PET), Polyimides, Polyoxymethylene plastic (POM/Acetal), Polyphenylene sulfide (PPS), Polyphenylene oxide (PPO), Polysulphone (PSU), Polytetrafluoroethylene (PTFE/Teflon), or Ultra-high-molecular-weight polyethylene (UHMWPE/UHMW), that is plated or coated with a conductive material such as gold, silver, copper, or nickel. According to certain embodiments, base plate 214 is a solid block of material with holes, slots, or cut-outs to accommodate clustered pillars 212, signal ears 216 and 220, and ground ears 218 and 222 on the top (radiating) side and connectors on the bottom side to connect feed lines. In other embodiments, base plate 214 includes cutouts to reduce weight.

According to certain embodiments, base plate 214 is designed to be modular and includes features in the ends that can mate with adjoining modules. Such interfaces can provide both structural rigidity and cross-interface conductivity. Modules may be various sizes incorporating various numbers of unit cells of radiating elements. According to certain embodiments, a module is a single unit cell. According to certain embodiments, modules are several unit cells (e.g., 2×2, 4×4), dozens of unit cells (e.g., 5×5, 6×8), hundreds of unit cells (e.g., 10×10, 20×20), thousands of unit cells (e.g., 50×50, 100×100), tens of thousands of unit cells (e.g., 200×200, 400×400), or more. According to certain embodiments, a module is rectangular rather than square (i.e., more cells along one axis than along the other).

According to certain embodiments, modules align along the centerline of a radiating element such that a first module ends with a ground clustered pillar and the next module begins with a ground clustered pillar. The base plate of the first module may include partial cutouts along its edge to mate with partial cutouts along the edge of the next module to form a receptacle to receive the radiating elements that fit between the ground clustered pillars along the edges of the two modules. According to certain embodiments, the base plate of a module extends further past the last set of ground clustered pillars along one edge than it does along the opposite edge in order to incorporate a last set of receptacles used to receive the set of radiating elements that form the transition between one module and the next. In these embodiments, the receptacles along the perimeter of the array remain empty. According to certain embodiments, a transition strip is used to join modules, with the transition strip incorporating a receptacle for the transition radiating elements. According to certain embodiments, no radiating elements bridge the transition from one module to the next. Arrays formed of modules according to certain embodiments can include various numbers of modules, such as two, four, eight, ten, fifteen, twenty, fifty, a hundred, or more.

In some embodiments, base plate 214 may be manufactured in various ways including machined, cast, or molded. In some embodiments, holes or cut-outs in base plate 214 may be created by milling, drilling, formed by wire EDM, or formed into the cast or mold used to create base plate 214. Base plate 214 can provide structural support for each radiating element and clustered pillar and provide overall structural support for the array or module. Base plate 214 may be of various thicknesses depending on the design requirements of a particular application. For example, an array or module of thousands of radiating elements may include a base plate that is thicker than the base plate of an array or module of a few hundred elements in order to provide the required structural rigidity for the larger dimensioned array. According to certain embodiments, the base plate is less than 6 inches thick. According to certain embodiments, the base plate is less than 3 inches thick, less than 1 inch thick, less than 0.5 inches thick, less than 0.25 inches thick, or less than 0.1 inches thick. According to certain embodiments, the base plate is between 0.2 and 0.3 inches thick. According to some embodiments, the thickness of the base plate may be scaled with frequency (for example, as a function of the wavelength of the highest designed frequency, $\lambda$). For example, the thickness of the base plate may be less than $1.0\lambda$, $0.5\lambda$, or less than $0.25\lambda$. According to some embodiments, the thickness of the base plate is greater than $0.1\lambda$, greater than $0.25\lambda$, greater than $0.5\lambda$, or greater than $1.0\lambda$.

According to certain embodiments, radiating ears 216, 218, 220 and 222 and clustered pillar 212 may be formed from any one or more materials suitable for use in a radiating antenna. These may include materials that are substantially conductive and that are relatively easily to machine, cast and/or solder or braze. For example, one or more radiating ears 216, 218, 220 and 222 and clustered pillar 212 may be formed from copper, aluminum, gold, silver, beryllium copper, or brass. In some embodiments, one or more radiating ears 216, 218, 220 and 222 and clustered pillar 212 may be substantially or completely solid. For example, one or more radiating ears 216, 218, 220 and 222 and clustered pillar 212 may be formed from a conductive material, for example, substantially solid copper, brass, gold, silver, beryllium copper, or aluminum. In other embodiments, one or more radiating ears 216, 218, 220 and 222 and clustered pillar 212 are substantially formed from non-conductive material, for example plastics such as ABS, Nylon, PA, PBT, PC, PEEK, PEK, PET, Polyimides, POM, PPS, PPO, PSU, PTFE, or UHMWPE, with their outer surfaces coated or plated with a suitable conductive material, such as copper, gold, silver, or nickel.

In other embodiments, one or more radiating ears 216, 218, 220 and 222 and clustered pillar 212 may be substantially or completely hollow, or have some combination of solid and hollow portions. For example, one or more radiating ears 216, 218, 220 and 222 and clustered pillar 212 may include a number of planar sheet cut-outs that are soldered, brazed, welded or otherwise held together to form a hollow three-dimensional structure. According to some embodiments, one or more radiating ears 216, 218, 220 and 222 and clustered pillar 212 are machined, molded, cast, or formed by wire-EDM. According to some embodiments, one or more radiating ears 216, 218, 220 and 222 and clustered pillar 212 are 3D printed, for example, from a conductive material or from a non-conductive material that is then coated or plated with a conductive material.

Figure 4A:
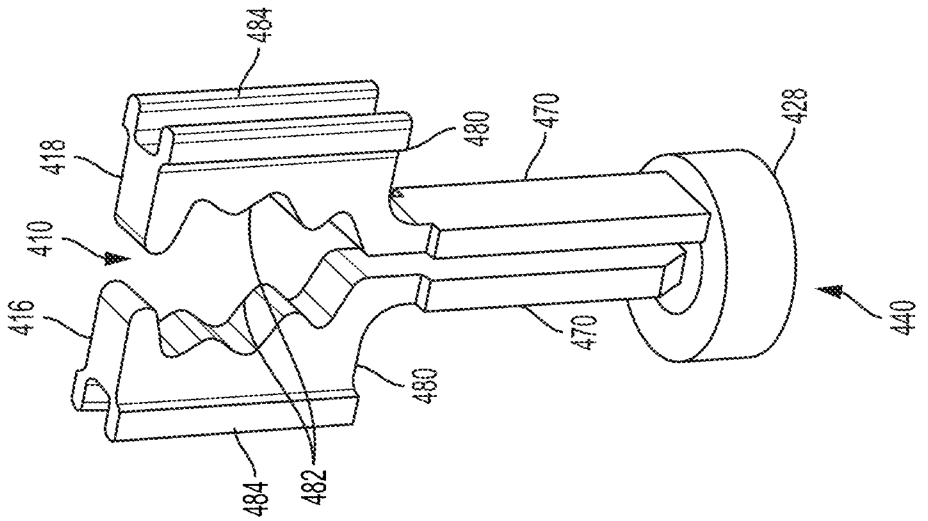
FIG. 4A is an isometric view of a radiating element of a phased array antenna according to certain embodiments.
Figure 4B:
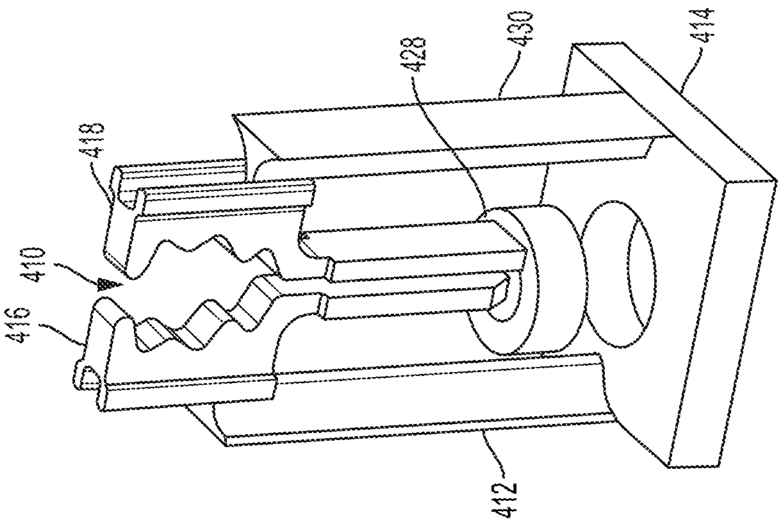
FIG. 4B is an isometric view of a unit cell of a single-polarized assembly of a phased array antenna according to certain embodiments.

Referring now to FIGS. 3A, 4A, and 4B, a method of manufacturing an array according to certain embodiments will be described. Base plate 214, radiating ears 216, 218, 220 and 222, and clustered pillar 212 are each separate pieces that may be manufactured according to the methods described above. Clustered pillar 212 is assembled to base plate 214 by welding or soldering onto base plate 214. In some embodiments, clustered pillar 212 is press fit (interference fit) into a hole in base plate 214. According to certain embodiments, clustered pillar 212 is screwed into base plate 214. For example, male threads may be formed into the bottom portion of clustered pillar 212 and female threads may be formed into the receiving hole in base plate 214.

According to certain embodiments, clustered pillar 212 is formed with a pin portion at its base that presses into a hole in base plate 214. According to certain embodiments, a bore is machined into clustered pillar 212 at the base to accommodate an end of a pin and a matching bore is formed in base plate 214 to accommodate the other end of the pin. Then the pin is pressed into the clustered pillar 212 or the base plate 214 and the clustered pillar 212 is pressed onto the base plate 214.

Referring to FIGS. 4A and 4B, a radiating element is assembled as a sub-assembly, which is inserted into base plate 214, according to certain embodiments. Signal ear 416 and ground ear 418 are separate pieces formed according to one or more methods including those described above. Signal ear 416 and ground ear 418 are assembled to plug 428. Plug 428 may be formed of a dielectric material, such as plastic, in order to maintain the electrical isolation of signal ear 416 from ground ear 418 and base plate 414. Plug 428 may be formed from various plastics such as ABS, Nylon, PA, PBT, PC, PEEK, PEK, PET, Polyimides, POM, PPS, PPO, PSU, or UHMWPE. Preferably, plug 428 is formed of resin, PTFE, or polylactic acid (PLA). According to certain embodiments, signal ear 416 and ground ear 418 are inserted into receptacles in plug 428, for example by press-fitting, to form assembly 440. According to other embodiments, plug 428 is molded around signal ear 416 and ground ear 418. Assembly 440 may then be assembled to the base plate 414 by sliding between clustered pillars 412 and 430 that have been previously assembled to base plate 414, for example, according to the methods described above. Plug 428 can then fit into a hole or bore in base plate 414, for example by press fitting. Plug 428 may be designed to not only provide structural support for signal ear 416 and ground ear 418 and but also for impedance transformation to mate with a coaxial connector, as described in more detail below.

Referring now to FIGS. 3A and 3C, gap 320 may be an air gap or it may be provided by a dielectric material, or a combination of both. As described above, gap 320 may be minimized in order to maximize the capacitive coupling of ground clustered pillar 212 with the adjacent radiating elements (e.g., 208 and 210). Minimizing gap 320 can be difficult when assembling multiple different components (e.g. base plate 214, clustered pillar 212, ears 220 and 216), each with their own manufacturing tolerances. Furthermore, the antenna array (e.g., array 200) may be subject to vibration that may cause adjacent radiating elements ears to contact clustered pillar 212 causing a short circuit. To manage these issues, according to certain embodiments, gap 320 is created and maintained by providing a dielectric coating on clustered pillar 214. According to certain embodiments, dielectric coatings may be epoxy coatings, PTFE, or a melt processable fluoropolymer applied using, for example, a spraying or dipping process.

Figure 5C:
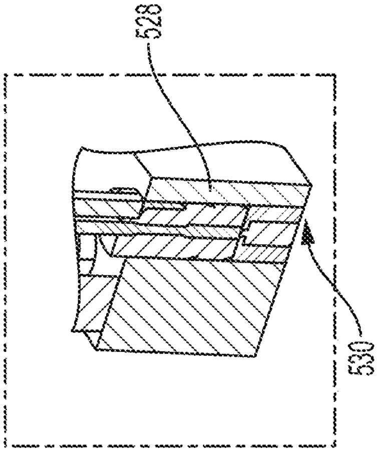
FIG. 5C is a cross-sectional view of a built-in radiating element RF interconnect/connector according to certain embodiments.
Figure 5D:
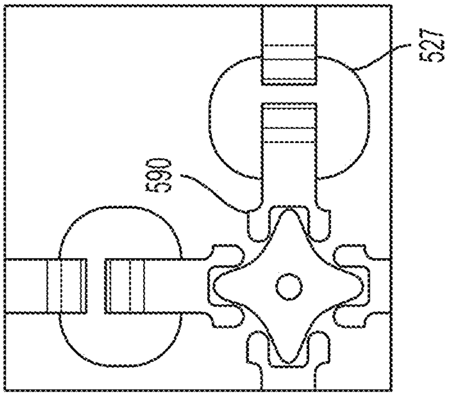
FIG. 5D is a top view of a unit cell of a dual-polarized phased array antenna with dielectric sleeve according to certain embodiments.
Figure 5B:
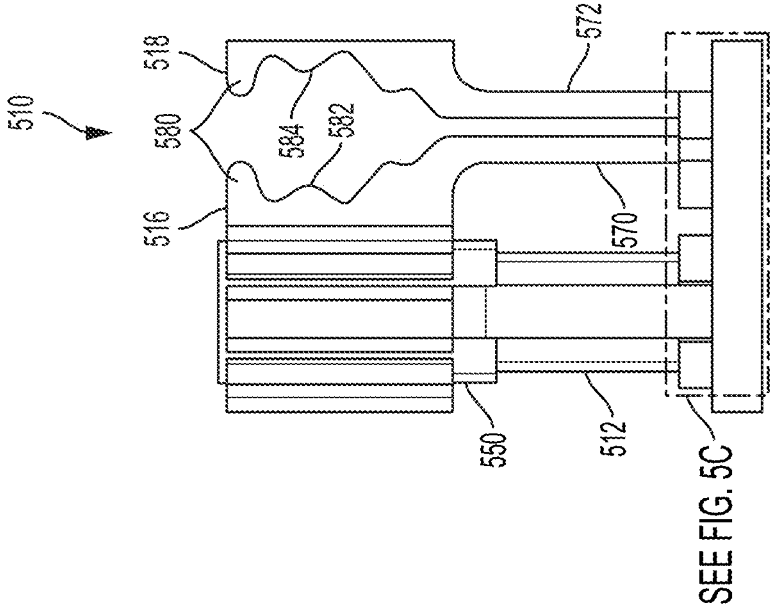
FIG. 5B is a side view of a unit cell of a dual-polarized phased array antenna with dielectric sleeve according to certain embodiments.
Figure 5A:
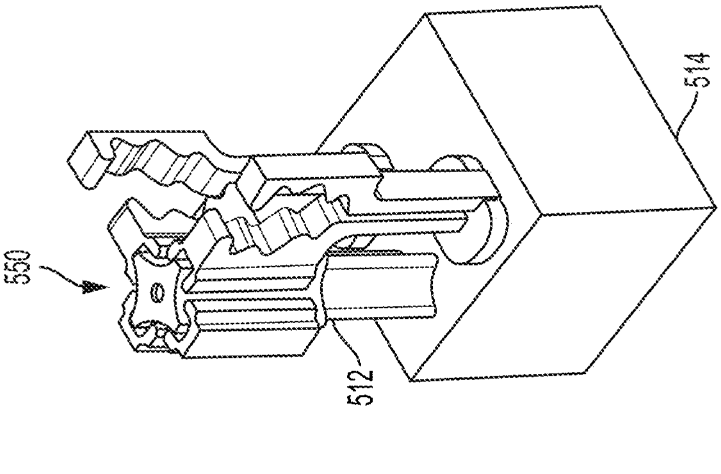
FIG. 5A is an isometric view of a unit cell of a dual-polarized phased array antenna with dielectric sleeve according to certain embodiments.

According to certain embodiments, for example as shown in FIGS. 5A, 5B, and 5D, gap 520 is created or maintained by dielectric sleeve 550 that slides over clustered pillar 512. Sleeve 550 may be formed from various dielectric materials such as plastics like ABS, Nylon, PA, PBT, PC, PEEK, PEK, PET, Polyimides, POM, PPS, PPO, PSU, PTFE, or UHMWPE. Sleeve 550 may made from a high strength plastic in order to minimize wall thickness. According to certain embodiments, sleeve 550 is formed from a heat shrink material, such as nylon or polyolefin, in the form of a tube that slides over clustered pillar 512, which is heated to shrink onto clustered pillar 512. According to certain embodiments, sleeve 550 is 3D printed from a polymer. Sleeve 550 is preferably designed with minimal wall thickness. According to certain embodiments, the thickness of sleeve 550 is less than 0.1 inches, preferably less than 0.05 inches, and more preferably less than 0.01 inches.

FIG. 5C illustrates a feed arrangement for providing the excitation to radiating element 502 according to certain embodiments. As described above, a radio beam is generated by creating an electrical potential between signal ear 516 and ground ear 518. This electrical potential is created by feeding voltage to signal ear 516 and grounding ground ear 518. According to certain embodiments, signal ear 516 is fed by connecting a coaxial cable to a coaxial connector 530 embedded or inserted in the bottom of base plate 514. Signal ear 516 is electrically connected to the center line inside plug 528. According to some embodiments, signal ear 516 forms the center line inside plug 528. Signal ear 516 is electrically connected to the inner conductor (core line) of a feed line through coaxial connector 530 as shown in FIG. 5C.

According to certain embodiments, connector 530 is a female connector. Base plate 514 may be electrically connected to the outer conductor (shield) of the coaxial cable through the body of coaxial connector 530. According to certain embodiments, ground ear 518 is directly electrically connected to the outer conductor of the coaxial cable through a ground conductor of coaxial connector 530. In other embodiments, ground ear 518 is inserted or formed into a side of plug 528 such that a portion of ground ear 518 is exposed, as depicted in FIGS. 5A and 5C. When plug 528 is inserted into base plate 514, the exposed side of ground ear 518 makes contact with base plate 514. Ground ear 518 is then electrically connected to base plate 514, which is in turn, electrically connected to ground through, for example, coaxial connector 530 or some other grounding means.

According to certain embodiments, signal ear 516, ground ear 518, plug 528, and connector 530 are built together as a subassembly that may then be assembled into base plate 514. According to certain embodiments, the center conductor of coaxial connector 530 and signal ear 516 are formed from a single piece of material. According to certain embodiments, connector 530 is embedded within base plate 528 (as shown in FIG. 5C). According to some embodiments, connector 530 protrudes from the bottom of base plate 528, protrudes from a recess in the bottom of base plate 514 or is affixed to the bottom plane of base plate 514. According to some embodiments, connector 530 is an off-the-shelf male or female connector, and according to other embodiments, connector 530 is custom built or modified for fitting into base plate 514. According to certain embodiments, connector 530 is designed to be directly attached to a feed line. According to other embodiments, connector 530 is attached to a feed line through an intermediate manifold that, itself, directly connects to feed lines.

Figure 6B:
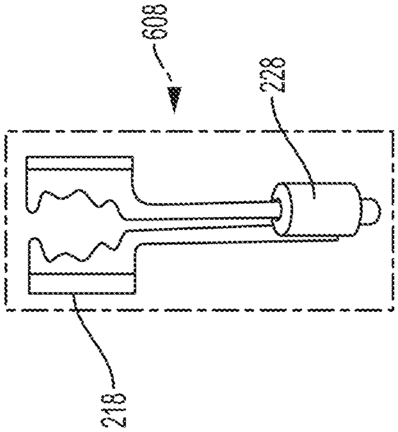
FIG. 6B is a three-dimensional view of a radiating element of a phased array antenna according to certain embodiments.
Figure 6A:
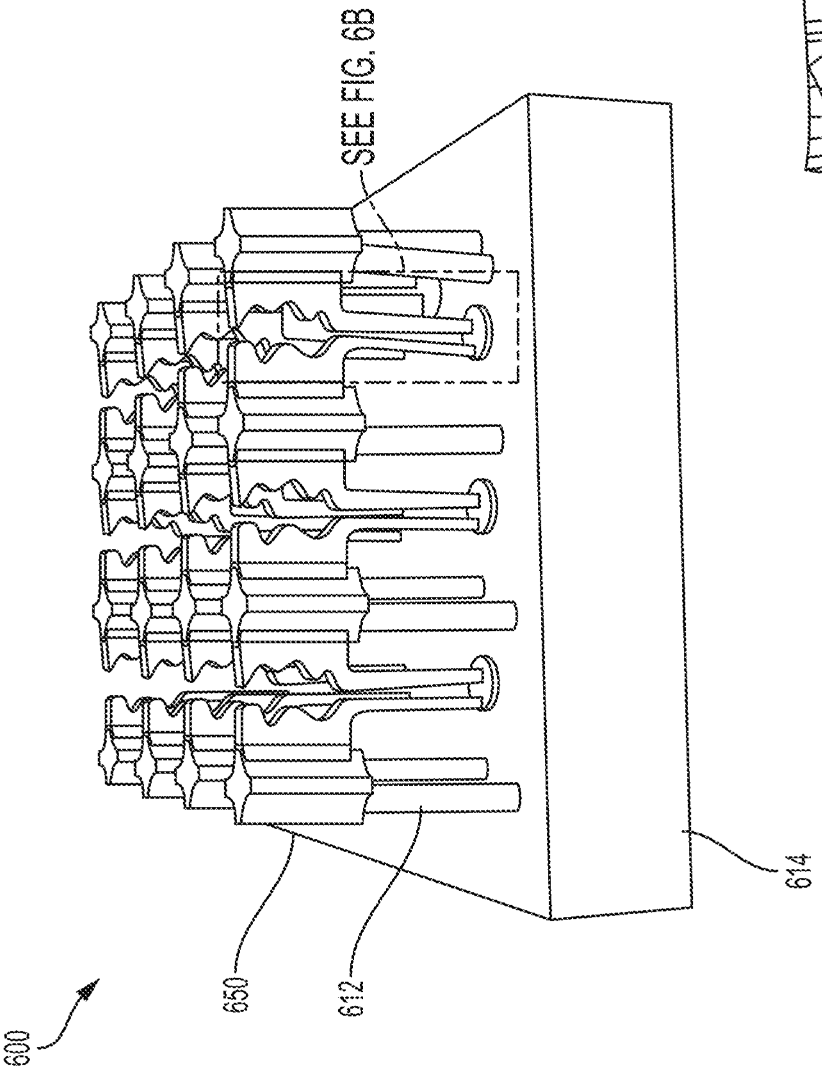
FIG. 6A is a three-dimensional view of a dual-polarized phased array antenna according to certain embodiments.
Figure 6C:
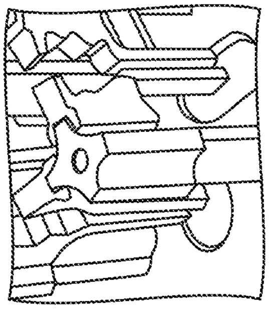
FIG. 6C is a three-dimensional close-up view of a unit cell of a dual-polarized phased array antenna according to certain embodiments.

FIGS. 6A, 6B, and 6C illustrate an antenna array 600 according to certain embodiments. Base plate 614 is formed from a block of aluminum. Clustered pillars 612 are machined directly into base plate 614 allowing for relatively good positional tolerances. A 3D printed dielectric sleeve 650 covers the ends of each clustered pillar 612. Radiating element assembly 640 is shown in FIG. 6B. In this figure, each ear 216 and 218 is formed of beryllium copper that has been shaped using wire EDM. Plug 628 is formed from a plastic such as resin, Teflon, or PLA that is molded around ears 216 and 218. Ground ear 218 is positioned on the side of plug 628 such that when the assembly 640 is assembled to base plate 614, ground ear 618 contacts the bore in base plate 614, thus creating a conducting path. Assembly 640 is assembled to base plate 614 by pressing plug 628 into the receiving bore or cut-out in base plate 614, for example using a slight interference fit. According to certain embodiments, plug 628 has an oblong shape that is longer in one direction than in the orthogonal direction to maintain the orientation of the ears along the axis of the relative row such that the capacitive coupling portion of the ears mate with the sleeve covered, cross shaped protrusions of the clustered pillar 612.

The phased array antenna 200, according to certain embodiments, has a designed operational frequency range, e.g., 1 to 30 GHz, 2 to 30 GHz, 3 to 25 GHz, and 3.5 to 21.5 GHz. According to certain embodiments, the phased array antenna is designed to operate at a frequency of at least 1 GHz, at least 2 GHz, at least 3 GHz, at least 5 GHz, at least 10 GHz, at least 15 GHz, or at least 20 GHz. According to certain embodiments, the phased array antenna is designed to operate at a frequency of less than 50 GHz, less than 40 GHz, less than 30 GHz, less than 25 GHZ, less than 22 GHZ, less than 20 GHz, or less than 15 GHz. The sizing and positioning of radiating elements can be designed to effectuate these desired frequencies and ranges. For example, the spacing between a portion of a first radiating element and the portion of the next radiating element along the same axis may be equal to or less than about one-half a wavelength, λ, of a desired frequency (e.g., highest design frequency). According to some embodiments, the spacing may be less than 1λ, less than 0.75λ, less than 0.66λ, less than 0.33λ, or less than 0.25λ. According to some embodiments, the spacing may be equal to or greater than 0.25λ, equal to or greater than 0.5λ, equal to or greater than 0.66λ, equal to or greater than 0.75λ, or equal to or greater than 1λ.

Additionally, the height of radiating element 208 and 210 may be less than about one-half the wavelength of the highest desired frequency. According to some embodiments, the hieght may be less than 1λ, less than 0.75λ, less than 0.66λ, less than 0.33λ, or less than 0.25λ. According to some embodiments, the height may be equal to or greater than 0.25λ, equal to or greater than 0.5λ, equal to or greater than 0.66λ, equal to or greater than 0.75λ, or equal to or greater than 1λ. For example, according to certain embodiments where the operational frequency range is 2 GHz to 14 GHz, with the wavelength at the highest frequency, 14 GHz, being about 0.84 inches, the spacing from one radiating element to another radiating element is less than about 0.42 inches. According to certain embodiments, for this same operating range, the height of a radiating element from the base plate is less than about 0.42 inches.

As another example, according to certain embodiments where the operational frequency range is 3.5 GHz to 21.5 GHz, with the wavelength at the highest frequency, 21.5 GHz, being about 0.6 inches, the spacing from one radiating element to another radiating element is less than about 0.3 inches. According to certain embodiments, for this same operating range, the height of a radiating element from the base plate is less than about 0.3 inches. It should be appreciated decreasing the height of the radiating elements can improve the cross-polarization isolation characteristic of the antenna. It should also be appreciated that using a radome (an antenna enclosure designed to be transparent to radio waves in the operational frequency range) can provide environmental protection for the array. The radome may also serve as a wide-angle impedance matching (WAIM) that improves the voltage standing wave ration (VSWR) of the array at wide-scan angles (improves the impedance matching at wide-scan angles).

According to certain embodiments, more spacing between radiating elements eases manufacturability. However, as described above, a maximum spacing can be selected to prevent grating lobes at the desired scan volumes. According to certain embodiments, the selected spacing reduces the manufacturing complexity, sacrificing scan volume, which may be advantageous where scan volume is not critical.

According to certain embodiments, the size of the array is determined by the required antenna gain. For example, for certain application over 40,000 elements are required. For another example, an array of 128 elements may be used for bi-static radar.

Asymmetric Phased Array

Figure 7B:
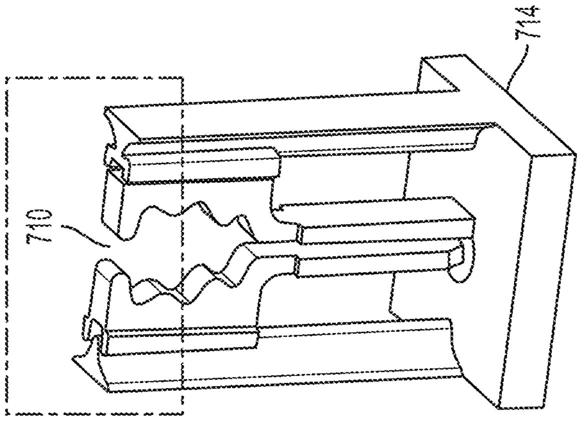
FIG. 7B is an isometric view of a unit cell of a single-polarized phased array antenna according to certain embodiments.
Figure 7A:
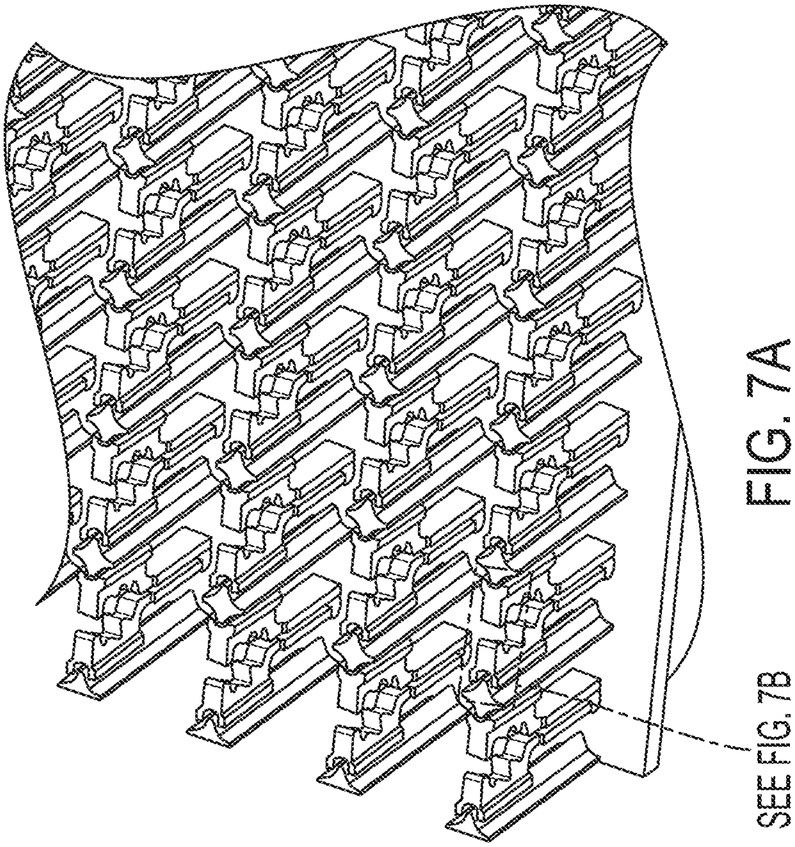
FIG. 7A is an isometric view of a single-polarized phased array antenna according to certain embodiments.

According to certain embodiment an asymmetric design is employed to increase the manufacturability of the phased array antenna. FIG. 7A illustrates a single polarized array 700 according to certain embodiments employing an asymmetric design. Each radiating element 710 includes a pair of metallic ears (716 and 718) that form a coplanar transmission line. Ground ear 718 is formed into the same block of material as base plate 714 and clustered pillars 712 and 730 and is effectively electrically terminated directly to base plate 714. As in the symmetric design described above, signal ear 716 can be connected to the center of a coaxial feed line. The edge of signal ear 716 is shaped to encapsulate clustered pillar 712, but the edge of ground ear 718 is substantially planar and does not wrap around clustered pillar 712. This enables ground ear 718 to be easily machined into the same base plate material or otherwise easily formed along with base plate 714.

Figure 7C:
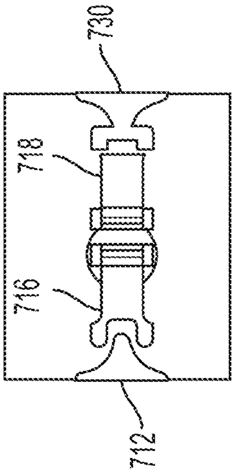
FIG. 7C is a top view of a unit cell of a single-polarized phased array antenna according to certain embodiments.

Following is a description of the asymmetric design, according to certain embodiments. Unit cell 702 is shown in FIG. 7B with a top view shown in FIG. 7C. As shown, for example on the right hand side of FIG. 7C, ground ear 718 is shaped differently on its capacitive coupling side than, for example, ground ear 418 in FIG. 4A. The capacitive coupling surface is flattened. This enables ground ear 418 to be machined into base plate 712, i.e. base plate 712 and ground ear 418 are machined into the same block of material. Additionally, according to certain embodiments, clustered pillar 730 has an irregular shape (as opposed to the regular cross shape of clustered pillar 212 in FIG. 3C, for example). The portion of clustered pillar 730 that capacitively couples with ground ear 718 is also flattened or planar to match clustered pillar 730. As shown on the right side of FIG. 7C, signal ear 716 has the same shape as the signal ear described above and the right side of clustered pillar 712 has the same cross shape as described in the sections above. This asymmetry enables base plate 714, clustered pillars 712 and 760, and ground ear 718 to be machined, or otherwise formed from the same piece of material increasing manufacturability by reducing the number of pieces, the assembly time, and tolerance stack-up effects while also maintaining performance.

Figure 8B:
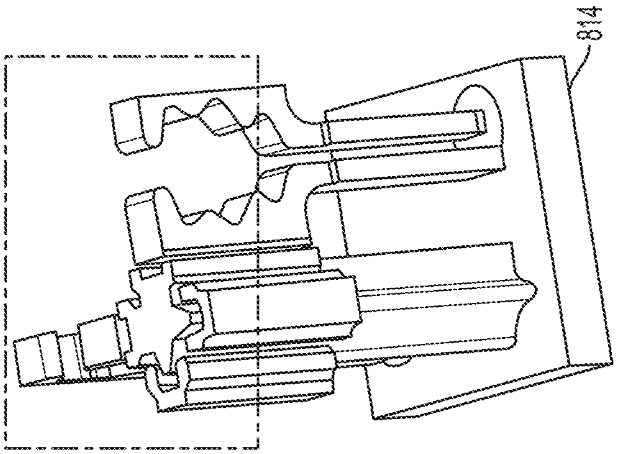
FIG. 8B is an isometric view of a unit cell of a dual-polarized phased array antenna according to certain embodiments.
Figure 8A:
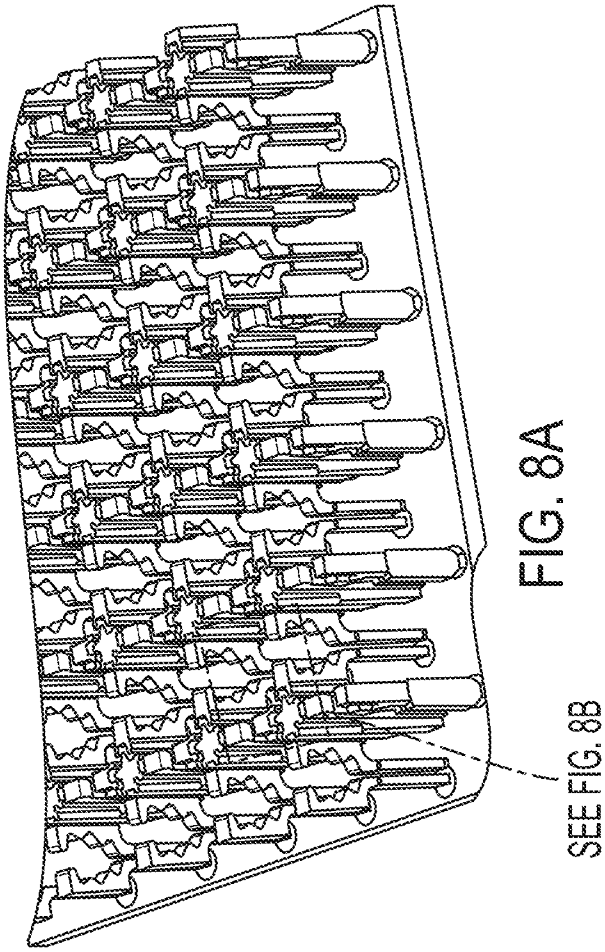
FIG. 8A is an isometric view of a dual-polarized phased array antenna according to certain embodiments.
Figure 8C:
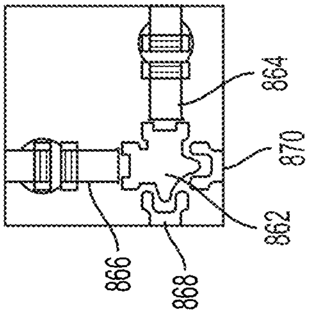
FIG. 8C is a top view of a unit cell of a dual-polarized phased array antenna according to certain embodiments.

According to certain embodiments, an asymmetric design is employed for a dual-polarized phased array antenna as shown in FIGS. 8A, 8B, and 8C. The same asymmetric configuration can be used for an orthogonal set of radiating elements 808. As shown in the top view of FIG. 8C, clustered pillar 862 is surrounded by ground ears 864 and 868 and signal ears 868 and 870. Signal ears 868 and 870 include the same u-shaped capacitive coupling surface described above while ground ears 864 and 866 incorporate a planar shape. This asymmetrical design enables clustered pillar 862 and ground ears 864 and 866 to be formed into the same piece of material as base plate 814.

According to certain embodiments, base plate 814, the clustered pillars (e.g., 862) and the ground ears (e.g., 864 and 866) are formed from conductive materials, such as a metal like aluminum, copper, gold, silver, beryllium copper, brass, and various steel alloys. According to certain embodiments, base plate 814, the clustered pillars (e.g., 862) and the ground ears (e.g., 864 and 866) are formed from a non-conductive material such as various plastics, including ABS, Nylon, PA, PBT, PC, PEEK, PEK, PET, Polyimides, POM, PPS, PPO, PSU, PTFE, or UHMWPE, that is plated or coated with a conductive material such as gold, silver, copper, or nickel. According to certain embodiments, base plate 814, the clustered pillars (e.g., 862) and the ground ears (e.g., 864 and 866) are a solid block of material with holes, slots, or cut-outs to accommodate the signal ears (e.g., 868 and 870) and connectors on the bottom side to connect feed lines. In other embodiments, base plate 814, the clustered pillars (e.g., 862) and the ground ears (e.g., 864 and 866) include cutouts to reduce weight.

According to certain embodiments, base plate 814, the clustered pillars (e.g., 862) and the ground ears (e.g., 864 and 866) are designed to be modular and base plate 814 includes features in the ends to mate with adjoining modules. Such interfaces may be designed to provide both structural rigidity and good cross-interface conductivity. In some embodiments, base plate 814, the clustered pillars (e.g., 862) and the ground ears (e.g., 864 and 866) can be manufactured in various ways including machined, cast, molded, and/or formed using wire-EDM. In some embodiments, holes or cut-outs in base plate 214 may be created by milling, drilling, wire EDM, or formed into the cast or mold used to create base plate 814, the clustered pillars (e.g., 862) and the ground ears (e.g., 864 and 866). Base plate 814 may be of various thicknesses depending on the design requirements of a particular application. Base plate 814 can provide structural support for each radiating element and clustered pillar as well as provide overall structural support for the array. For example, an array of thousands of radiating elements may have a base plate that is thicker than that of an array of a few hundred elements in order to provide the required structural rigidity for the larger dimensioned array. According to certain embodiments, the base plate is less than 6 inches thick. According to certain embodiments, the base plate is less than 3 inches thick, less than 1 inch thick, less than 0.5 inches thick, less than 0.25 inches thick, or less than 0.1 inches thick. According to certain embodiments, the base plate is between 0.2 and 0.3 inches thick.

Radiating Element

As described above, radiating elements (e.g., 410 of FIG. 4A), according to certain embodiments, include pairs of radiating element ears, a ground ear (e.g., 418) and a signal ear (e.g., 418). The design of the radiating elements affects the beam forming and steering characteristics of the phased array antenna. For example, as discussed above, the height of the radiating element may affect the operational frequency range. For example, the shortest wavelength (corresponding to the highest frequency) may be equivalent to twice the height of the radiating element. In addition to this design parameter, other features of the radiating element can affect bandwidth, cross-polarization, scan volume, and other antenna performance characteristics. According to the embodiment shown in FIG. 4, radiating element 410 includes a symmetrical portion that is symmetrical from just above the top of plug 428 to the top of element 410 such that the upper portion of ground ear 418 is a mirror image of the upper portion of signal ear 416. Each ear includes a connecting portion for connecting to plug 428, a stem portion 470, and a comb portion 480. Each comb portion 480 includes an inner facing irregular surface 482 and an outward facing capacitive coupling portion 484.

An important design consideration in phased array antennas is the impedance matching of the radiating element. This impedance matching affects the achievable frequency bandwidth as well as the antenna gain. With poor impedance matching, bandwidth may be reduced and higher losses may occur resulting in reduced antenna gain.

As is known in the art, impedance refers, in the present context, to the ratio of the time-averaged value of voltage and current in a given section of the radiating elements. This ratio, and thus the impedance of each section, depends on the geometrical properties of the radiating element, such as, for example, element width, the spacing between the signal ear the ground ear, and the dielectric properties of the materials employed. If a radiating element is interconnected with a transmission line having different impedance, the difference in impedances ("impedance step" or "impedance mismatch") causes a partial reflection of a signal traveling through the transmission line and radiating element. The same can occur between the radiating element and free space. "Impedance matching" is a process for reducing or eliminating such partial signal reflections by matching the impedance of a section of the radiating element to the impedance of the adjoining transmission line or free space. As such, impedance matching establishes a condition for maximum power transfer at such junctions. "Impedance transformation" is a process of gradually transforming the impedance of the radiating element from a first matched impedance at one end (e.g., the transmission line connecting end) to a second matched impedance at the opposite end (e.g., the free space end).

According to certain embodiments, transmission feed lines provide the radiating elements of a phased array antenna with excitation signals. The transmission feed lines may be specialized cables designed to carry alternating current of radio frequency. In certain embodiments, the transmission feed lines may each have an impedance of 50 ohms. In certain embodiments, when the transmission feed lines are excited in-phase, the characteristic impedance of the transmission feed lines may also be 50 ohms. As understood by one of ordinary skill in the art, it is desirable to design a radiating element to perform impedance transformation from this 50 ohm impedance into the antenna at the connector, e.g., connector 530 in FIG. 5C, to the impedance of free space, given by 120×pi (377) ohms. By designing the radiating element, base plate, plug, and connector to achieve this impedance transformation, the phased array antenna can be easily coupled to a control circuit without the need for intermediate impedance transformation components.

According to certain embodiments, instead of designing the phased array antenna for 50 ohm impedance into connector 530, the antenna is designed for another impedance into connector 530, such as 100 ohms, 150 ohms, 200 ohms, or 250 ohms, for example. According to certain embodiments, a radiating element is designed for impedance matching to some other value than free space (377 ohms), for example, when a radome is to be used.

According to certain embodiments, the radiating element is designed to have optimal impedance transfer from transmission feed line to free space. It will be appreciated by those of ordinary skill in the art, that the radiating element can have various shapes to effect the impedance transformation required to provide optimal impedance matching, as described above. The described embodiments can be modified using known methods to match the impedance of the fifty ohm feed to free space.

Referring again to FIG. 5C, according to certain embodiments, connector 530, plug 258, and the connecting portions of signal ear 516 and ground ear 518 result in impedance at the base of the stem portions of the signal and ground ears of about 150 ohms. According to some embodiments, this value is between 50 and 150 ohms and in other embodiments, this value is between 150 and 350 ohms. According to certain embodiments, the value is around 300 ohms. The shape of the stem and comb portions are designed to perform the remaining impedance transformation (e.g., from 150 ohm to 377 ohm or from 300 ohm to 377 ohm).

Referring to FIG. 5B, stem portion 570 and 572 of signal ear 516 and ground ear 518, respectively, are parallel and spaced apart. According to certain embodiments, the distance between the stem portions is less than 0.5 inches, less than 0.1 inches, or less than 0.05. According to certain embodiments, the spacing is less than 0.025 inches, less than 0.02 inches, less than 0.015 inches, or less than 0.010 inches. According to some embodiments, the spacing between stem portions is selected to optimize the impedance matching of the antenna element. According to some embodiments, the spacing is selected based on the configuration of a connector embedded in base plate 514. According to some embodiments, the distance between the stem portions may be scaled with frequency (for example, the distance may be a function of the wavelength of the highest designed frequency). For example, according to some embodiments, the distance can be less than 0.05λ, less than 0.025λ, or less than 0.013λ. According to some embodiments, the distance can be greater than 0.001λ, greater than 0.005λ, greater than 0.01λ, or greater than 0.05λ.

As shown in FIG. 5B, the comb portion 580 of signal ear 516 includes inner-facing irregular surface 582 and the comb portion 580 of ground ear 518 includes inner-facing irregular surface 584. The inner-facing irregular surfaces 582 and 584 are symmetrical and include multiple lobes or projections. The placement and spacing of the lobes affects the impedance transformation of radiating element 510. According to the embodiment shown in FIG. 5B, these inner-facing surfaces curve away from the center line starting near the top of the stem portions 570 and 572 into first valleys and then curve toward the centerline into first lobes. The surfaces then curve away again into second valleys and curve toward the centerline again into second lobes. From the second lobes, the surfaces curve away again into third valleys and then curve inward once more into final lobes. The sizes, shapes, and numbers of these lobes and valleys contribute to the impedance transformation of the radiating element. For example, according to certain embodiments, a radiating element ear includes only one lobe, for example, at the distal end (i.e., inner-facing irregular surface has a “C” shaped profile).

In addition to the shape, the thickness of a radiating element ear may also affect the impedance transformation of the radiating element. According to certain embodiments, the thickness is less than 0.5 inches or less than 0.25 inches. According to certain embodiments, the thickness is preferably less than 0.125 inches, less than 0.063, less than 0.032, less than 0.016, or less than 0.008 inches. According to certain embodiments, the thickness is between 0.035 and 0.045 inches. According to certain embodiments, the thickness is greater than 0.03 inches, greater than 0.1 inches, greater than 0.25 inches, greater than 0.5 inches, or greater than 1 inch. According to some embodiments, the thickness may be scaled with frequency (for example, the distance may be a function of the wavelength of the highest designed frequency). For example, according to some embodiments, the thickness can be less than 0.2λ, less than 0.1λ, less than 0.05λ. or less than 0.01λ. According to some embodiments, the thickness can be greater than 0.005λ, greater than 0.01λ, greater than 0.05λ, or greater than 0.1λ.

According to other embodiments, a radiating element ear includes two lobes, four lobes, five lobes, or more. According to certain embodiments, instead of lobes, the radiating element ear includes comb-shaped teeth, saw-tooth shaped lobes, blocky lobes, or a regular wave pattern. According to some embodiments, ears of radiating elements have other shapes, for example they may be splines, or straight lines. Straight line designs may be desirable if the antenna array is designed to operate only at a single frequency, if for example, the frequency spectrum is polluted at other frequencies. As appreciated by one of ordinary skill in the art, various techniques can be used to simulate the impedance transformation of radiating elements in order to tailor the shapes of the inner-facing irregular surfaces to the impedance transformation requirements for a given phased array antenna design.

In addition to impedance matching, the shape of the inner-facing surfaces of the comb portions can affect the operational frequency range. Other design considerations may also affect the frequency range. For example, the shape of the capacitive coupling portion 590 and the manner in which it forms a capacitive interface with the adjoining clustered pillar can affect the frequency range. According to certain embodiments, for example, an antenna array according to certain embodiments, without a clustered pillar may have a lower frequency threshold of 5 GHz and the same array with the clustered pillar may have a lower frequency threshold of 2 GHz.

According to certain embodiments, a radiating element 510 can be designed with certain dimensions to operate in a radio frequency band from 3 to 22 GHz. For example, radiating element 510 may be between 0.5 inches and 0.3 inches tall (preferably between 0.45 inches and 0.35 inches tall) from the top of base plate 514 to the top of radiating element 510. According to some embodiments, the height of the radiating elements may be scaled with frequency (for example, the height may be a function of the wavelength of the highest designed frequency). For example, according to some embodiments, the height can be less than 2.0λ, less than 1.0λ, less than 0.75λ, less than 0.5λ, or less than 0.25λ. According to some embodiments, the height can be greater than 0.1λ, greater than 0.2λ, greater than 0.5λ, or greater than 1.0λ.

Stem portions 570 and 572 may be between than 0.5 inches and 0.1 inches tall and preferably between 0.2 inches and 0.25 inches tall. Stem portions 570 and 572 may be scaled by the radiating element height. For example, the height of the stem portions may be equal to or less than ¾ of the element height, equal to or less than ⅔ the element height, equal to or less than ½ the element height, or equal to or less than ¼ of the element height. According to some embodiments, comb portions 580 constitute the remainder of the element height. According to some embodiments, comb portions 580 may be between 0.1 and 0.3 inches tall and preferably between 0.15 and 0.2 inches tall. According to certain embodiments, the distance from the outer edge of the capacitive coupling portion 590 of signal ear 516 to the outer edge of the capacitive coupling portion 590 of ground ear 518 may be between 0.15 inches and 0.30 inches and preferably between 0.2 and 0.25 inches. According to certain embodiments, these values are scaled up or down for a desired frequency bandwidth. For example, arrays designed for lower frequencies are scaled up (larger dimensions) and arrays designed for higher frequencies are scaled down (smaller dimensions).

Performance

Embodiments of phased array antennas described herein may exhibit superior performance over existing phased array antennas. For example, embodiments may exhibit large bandwidth, high scan volume, low cross polarization, and low average voltage standing wave ratio (VSWR), with small aperture and low cost.

According to certain embodiments, the phased array antenna is able to achieve greater than 5:1 bandwidth ratio, where the bandwidth ratio is the ratio of the frequency to the lowest frequency at which VSWR is less than 3:1 throughout the scan volume. Some embodiment may achieve greater than 6:1 bandwidth ratio or greater than 6.5:1 bandwidth ratio. Certain embodiments may achieve greater than 6.6:1 bandwidth ratio. According to certain embodiments, the phased array antenna is capable of achieving a frequency range from 2 to 30 GHz, where the frequency range is defined as the range of frequencies at which VSWR is less than 3:1 throughout the scan volume. Certain embodiment may achieve 3 to 25 GHz and certain embodiments may achieve 3.5 to 21.2 GHz. Certain embodiment may achieve ranges of, e.g., 1 to 30 GHz, 2 to 30 GHz, 3 to 25 GHz, and 3.5 to 21.5 GHz. According to certain embodiments, the phased array antenna can operate at a frequency of at least 1 GHz, at least 2 GHz, at least 3 GHz, at least 5 GHz, at least 10 GHz, at least 15 GHz, or at least 20 GHz. According to certain embodiments, the phased array antenna is designed to operate at a frequency of less than 50 GHz, less than 40 GHz, less than 30 GHz, less than 25 GHz, less than 22 GHz, less than 20 GHz, or less than 15 GHz. The capacitive coupling of the radiating elements, according to certain embodiments, can result in increased bandwidth because the array is matched at the low-frequency end.

Phased array antennas according to certain embodiments can achieve high scan volume. Reduced radiating element spacing, according to some embodiments (e.g., equal to or less than one-half the wavelength at the highest design frequency), can result in increased scan volume due to the reduction in grating lobes. Certain embodiments can have a scan volume of at least at least 30 degrees from broadside over full azimuth. In other words, the beam can be steered in a range of angles from 0 degrees (broadside) to at least 30 degrees from broadside over the full azimuth (in any direction on a plane parallel to the array plane) without producing grating lobes. Certain embodiments can have a scan volume of at least at least 45 degrees from broadside over full azimuth. Certain embodiments can have a scan volume of at least at least 60 degrees from broadside over full azimuth. According to some embodiments, the scan volume is at least 30 degrees with VSWR of less than 4:1. According to some embodiments, the scan volume is at least 45 degrees with VSWR of less than 3:1.

According to certain embodiments, the phased array antenna has low VSWR characteristics. VSWR measures how well an antenna is impedance matched to the transmission line to which it is connected (for example, using a Vector Network Analyzer, such as the Agilent 8510 VNA, according to known methods). The lower the VSWR, the better the antenna is matched to the transmission line and the more power is delivered to the antenna. Low VSWR is important in maximizing the gain of the antenna array, which can result in fewer required radiating elements, which results in reduced aperture, lower weight, and lower cost. According to certain embodiments, the average VSWR (statistical mean of VSWR values at some frequency) is below 5:1, below 3:1, or below 2.5:1. According to certain embodiments, the average VSWR is below 2.5:1 for plus or minus 45 degrees from broadside over full azimuth. According to certain embodiments, the average VSWR is below 1.8:1 for plus or minus 45 degrees from broadside over full azimuth. According to certain embodiments, the average VSWR is below 1.5:1 for plus or minus 45 degrees from broadside over full azimuth. According to some embodiments, the average VSWR is below 5:1, below 3:1, below 2.5:1, or below 1.5:1 for plus or minus 45 degrees from broadside over full azimuth over a frequency range of, e.g., 1 to 30 GHz, 2 to 30 GHz, 3 to 25 GHz, and 3.5 to 21.5 GHz.

Figure 9:
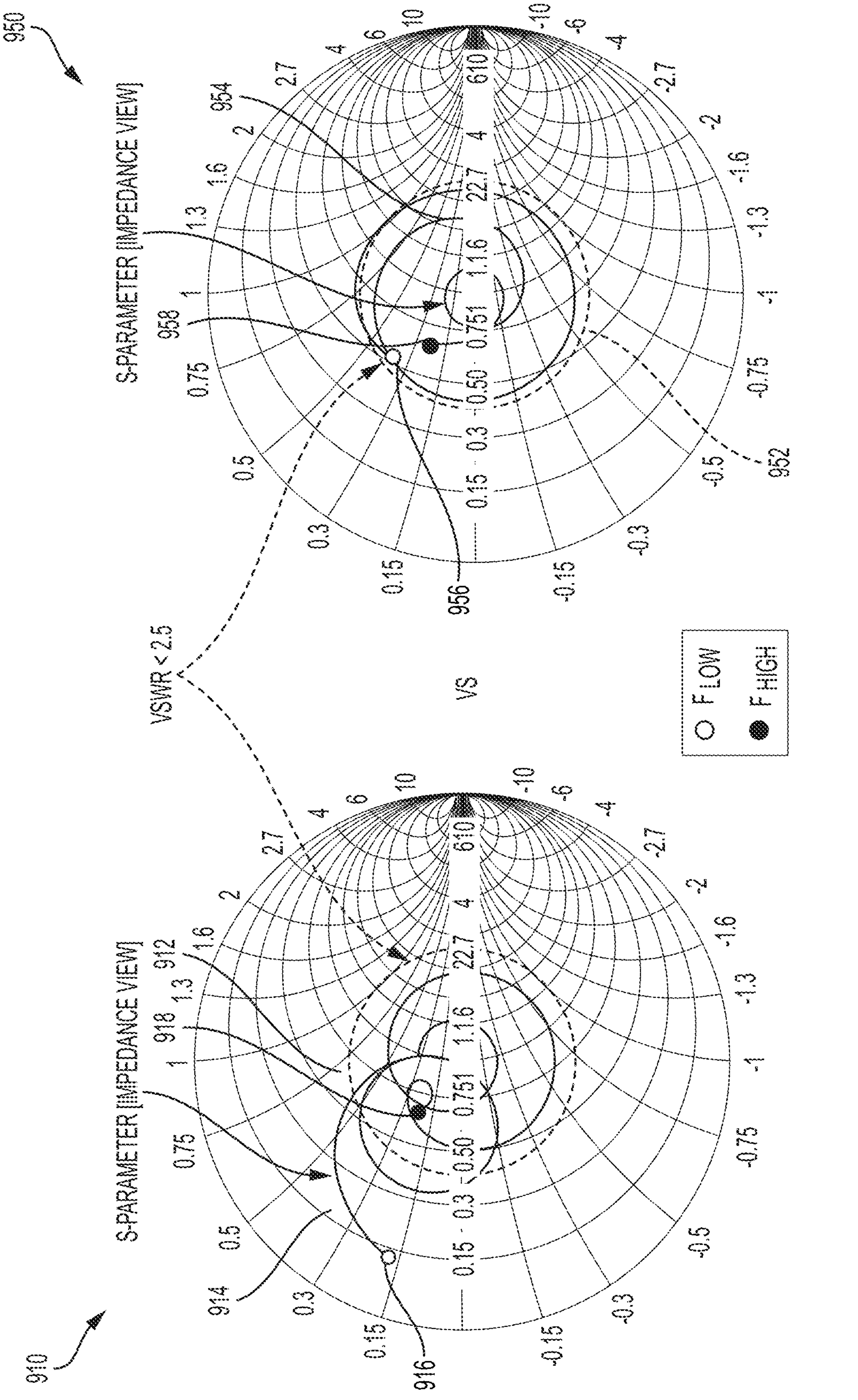
FIG. 9 is a Smith chart comparison of a phased array antenna according to certain embodiments.

In FIG. 9, the s-parameter is plotted to characterize the active input impedance of the unit-cell, e.g. unit cell 202, according to certain embodiments. The s-parameter may be measured using a Vector Network Analyzer (VNA), such as the Agilent 8510 VNA. It is generally desirable to confine the unit-cell response inside a VSWR of less than a certain value. For example, plot 910 and plot 950 of FIG. 9 provide circles 912 and 952 showing a VSWR of less than 2.5. Plot 910 is a plot of the s-parameter values for a unit cell of radiating elements without the clustered pillar (e.g., unit cell 202 in FIG. 2 without clustered pillar 212). Curve 914 is a plot of the impedance characteristics of the unit cell from the lowest frequency 916 to the highest frequency 918. As shown, toward the lower frequency range (beginning at the lowest frequency 916), the unit cell without the clustered pillar exhibits poor impedance characteristics—high VSWR.

Plot 950 is a plot of the s-parameter values for a unit cell of radiating elements with the clustered pillar (e.g., unit cell 202 in FIG. 2). Curve 954 is a plot of the impedance characteristics of the unit cell from the lowest frequency 956 to the highest frequency 958. As shown, the unit cell exhibit good impedance performance (less than 2.5 VSWR) within the entire frequency range. This demonstrates certain effects of the capacitive coupling attributable to the clustered pillars and the capacitive coupling portions of the radiating elements. In other words, the capacitive coupling of the clustered pillars can cancel the inductance part of the antenna, making it all well matched.

Figure 10A:
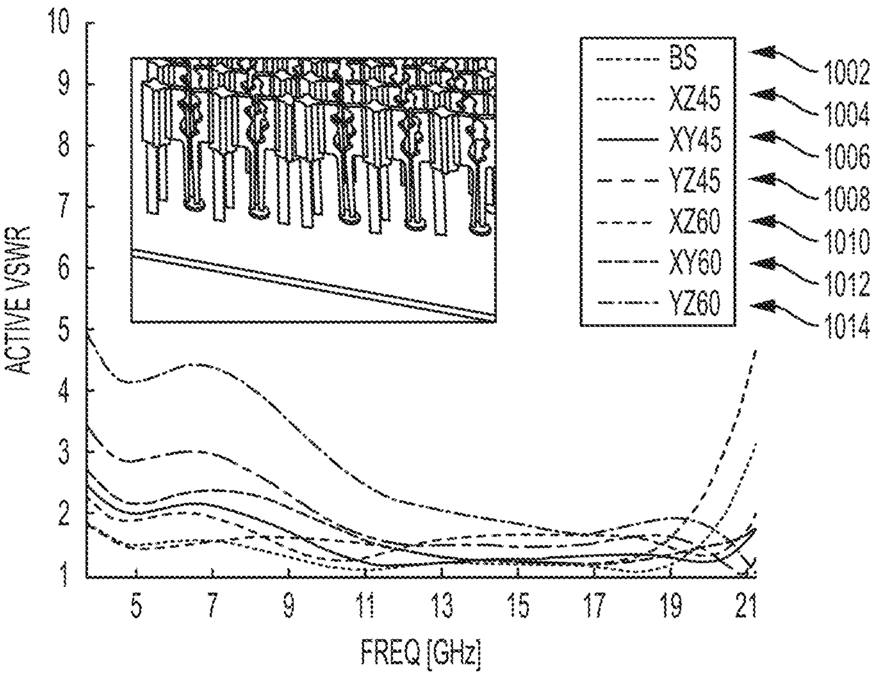
FIG. 10A is a plot of the scan-impedance performance of a phased array antenna according to certain embodiments.

The active VSWR across the operational frequency of a phased array antenna according to certain embodiments is plotted in FIG. 10A. The measurements from several scan points are plotted across the operational frequency. For example, line 1002 shows the performance at broadside. Line 1004 shows 45 degrees from broadside on the x-z plane, line 1006 shows 45 degrees from broadside on the x-y plane, and line 1008 shows 45 degrees from broadside on the y-z plane. Lines 1010, 1012, and 1014 show 60 degrees from broadside on the respective planes. The average VSWR across the frequency range from 2.5 GHz to 21.2 GHz is 1.72 at broadside, 1.72 at 45 degrees from broadside on the x-z plane, and 2.29 at 45 degrees From broadside on the y-z plane. According to certain embodiments, the shape of the inner-facing surfaces of the radiating elements controls the positions of the peaks and valleys plotted in FIG. 10A.

Figure 10B:
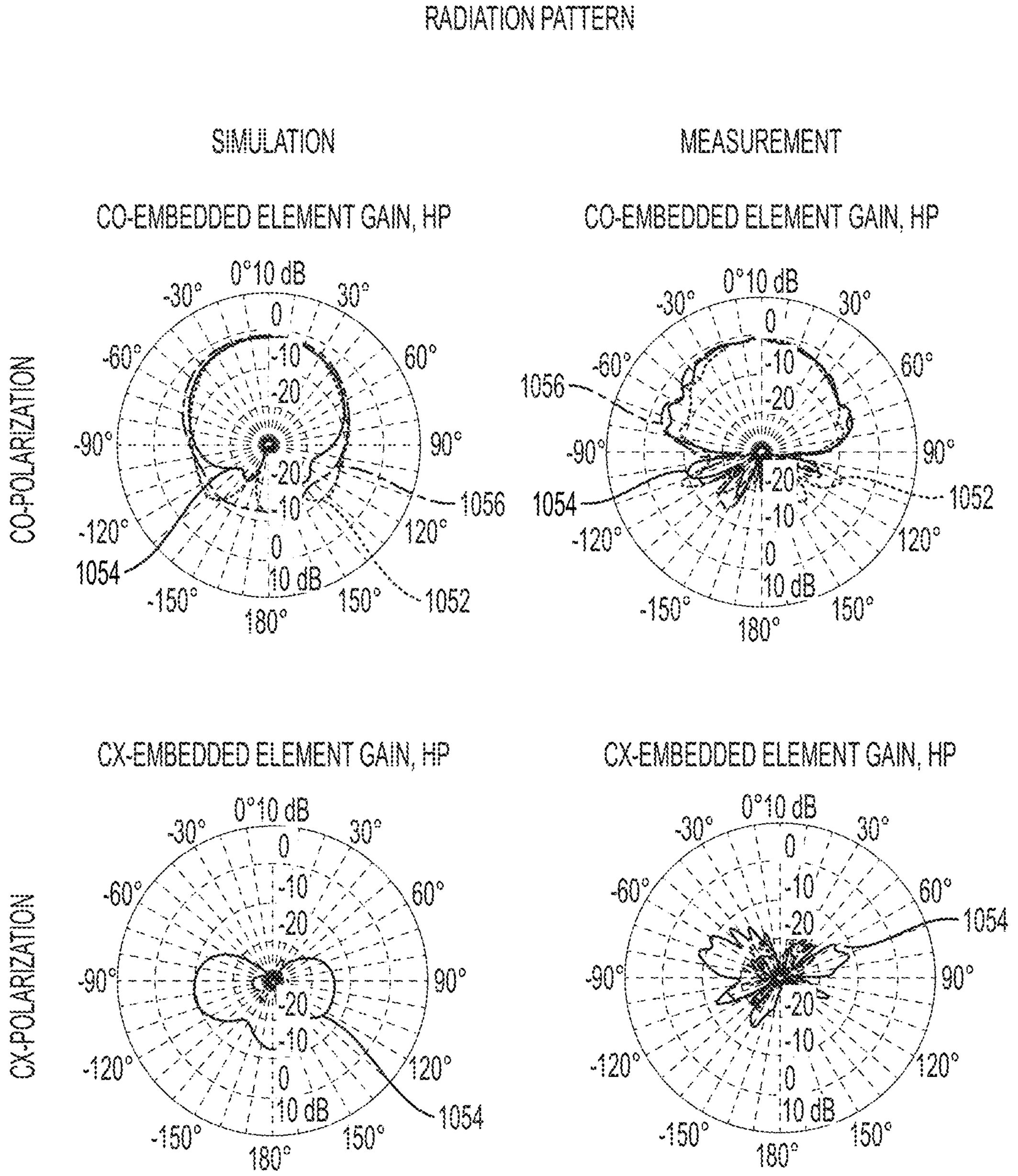
FIG. 10B is a series of plots of the predicted and actual measured radiation pattern of a phased array antenna according to certain embodiments.

FIG. 10B provides the embedded element radiation pattern of three principal plane cuts (E-plane, D-plane, and H-plane) with a comparison between simulation results (left side) and measurement results (right side), for a single polarization according to certain embodiments. E-plane 1052, H-plane 1054, and D-plane 1056 cuts are plotted. The top plots are the co-polarization element gain and the bottom plots are the cross-polarization element gain. As shown, the cross-polarization performance is good (minimal cross-polarization gain), with the diagonal cross polarization being less than −17 dB at 45 degrees from broadside.

Relaxed Lattice Spacing

As discussed above with respect to FIGS. 2A-C and FIGS. 3A-C, the capacitive coupling between a ground ear and a clustered pillar can have an impact on the spacing of radiating elements in the phased array. The capacitive coupling between a radiating element (such as a signal ear or ground ear) and a clustered pillar can be used to improve the impedance matching of the antenna. As discussed above, the capacitive coupling between a clustered pillar and a radiating element can be a function of the surface overlap of the pillar and radiating element, as well as the width of the gap between the pillar and radiating element. Thus, by changing the shape of the clustered pillar or the shape of the radiating element, the capacitive coupling can be increased or decreased.

As discussed above, the impedance matching of the antenna has a substantial effect on the performance of the antenna. Thus, if the shape of the radiating element or the clustered pillar is changed so as to increase the surface overlap between the radiating element and the clustered pillar (i.e., increase the coupling between the two elements), the gap between the elements can be increased in order to maintain the impedance matching. By increasing the gap between the elements, less elements can be used in the array, while maintaining performance.

Figure 11B:
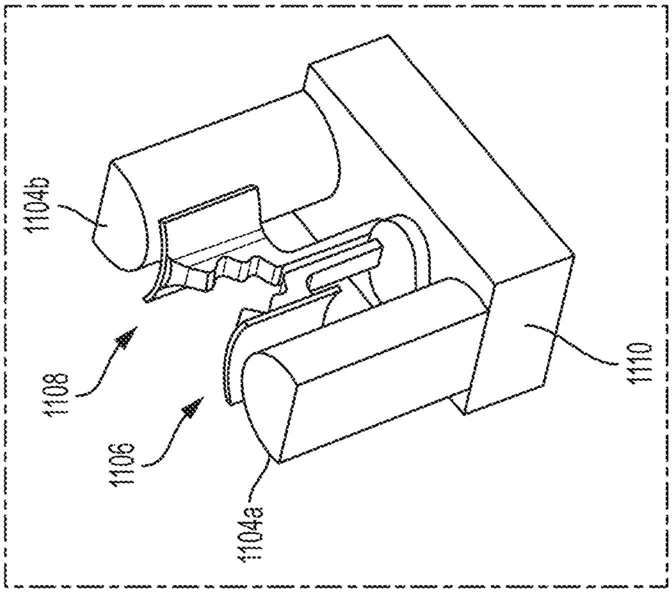
FIG. 11B illustrates a unit cell in which the components are shaped so as to provide increased coupling between a clustered pillar and the radiating element according to examples of the disclosure.
Figure 11A:
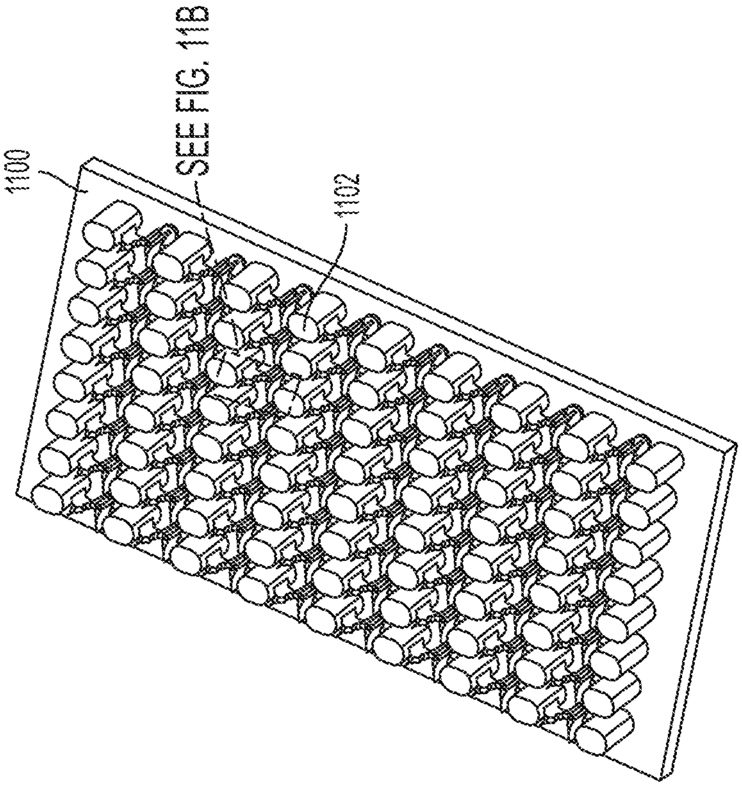
FIG. 11A illustrates a phased array antenna in which the components are shaped so as to provide increased coupling between a clustered pillar and the radiating element according to examples of the disclosure.

FIGS. 11A-B illustrate a unit cell in which the components are shaped so as to provide increased coupling between a clustered pillar and the radiating element according to examples of the disclosure. In the example of FIGS. 11A-B, phased array 1100 can include a plurality of unit cells 1102. Each unit cell 1102 can include a clustered pillar 1104*a-b*, a signal ear 1106, a ground ear 1104, and a base plate 1110. It should be understood that illustrations of unit cell 1102 illustrated in FIGS. 11A-B truncate clustered pillars 1104*a-b* for illustrative purposes only. In the example of FIGS. 11A-B, the phased array is shown in a single pole configuration, meaning the antenna is configured to receive signals in a single polarization. A phased array that receives in a single polarization can be useful in scenarios in which the targets of interests are transmitting along one coordinate plane such as the horizon, thus only requiring the azimuth to be scanned by the phased array.

The components of the unit cell 1102 (i.e., the base plate 1110, the ground clustered pillars 11A-B, the signal ear 1106 and the ground ear 1108) can be manufactured from the same materials, and operate in substantially the same ways as discussed above with respect to the phase array antennas of FIGS. 2A-C and FIGS. 3A-C. The primary difference (as further discussed below) between the phased array antenna of FIGS. 2A-C, FIGS. 3A-C, and the antenna of FIG. 11 is the shape of the clustered pillars 1104*a-b*, the shape of the of signal ear 1106, and the shape of the ground ear 1108.

Figure 12C:
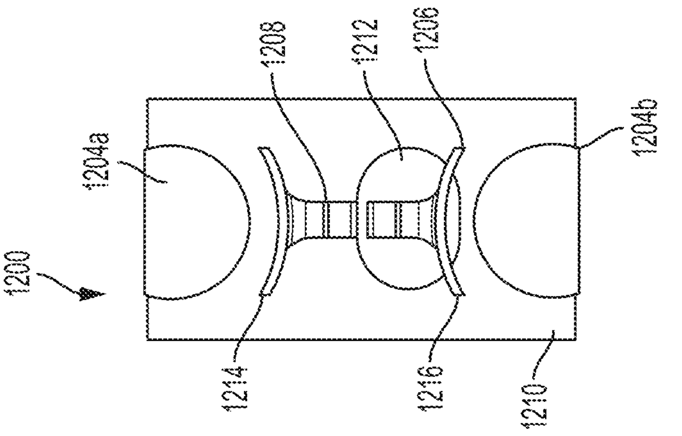
FIG. 12C illustrates another view of the phased array depicted in FIG. 12A according to examples of the disclosure.
Figure 12B:
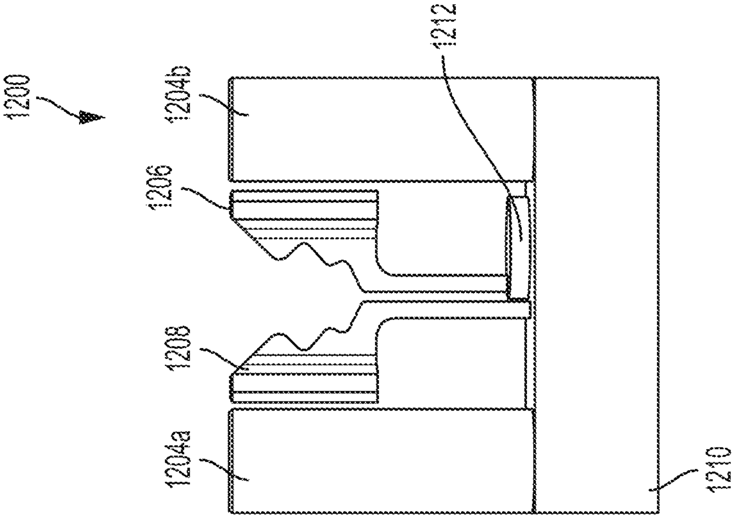
FIG. 12B illustrates another view of the phased array depicted in FIG. 12A according to examples of the disclosure.
Figure 12A:
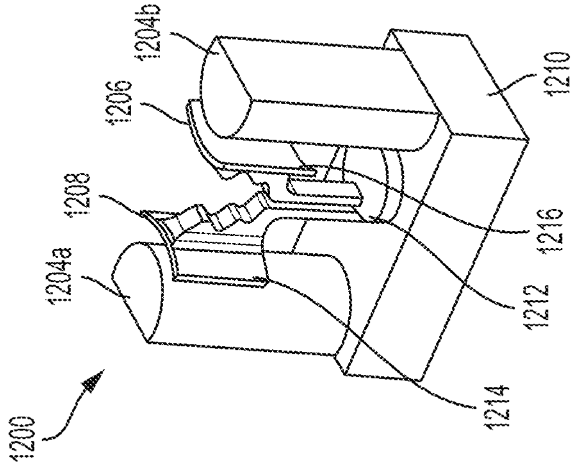
FIG. 12A illustrates a phased array with relaxed lattice spacing that utilizes the radiating element of FIG. 11 according to examples of the disclosure.

FIGS. 12A-C illustrate an isometric, side, and top view of a unit cell of a phased array according to examples of the disclosure. As discussed with respect to FIG. 11, the unit cell 1200 illustrated in FIGS. 12A-C, can represent a single-pole configuration wherein the unit cells can be arranged on a lattice of the phased array in a first polarization axis (i.e., either horizontally or vertically polarized). Like the example of FIG. 11, unit cell 1200 can include a base plate 1210, clustered pillars 1204*a-b*, ground ear 1208, and signal ear 1206. Also illustrated in the figure is plug 1212. As discussed in further detail below, the signal ear 1206 can be overmolded into plug 1212 and then then inserted into base plate 1210.

Turning to FIG. 12C (i.e., the top view of unit cell 1200), the shape of the signal ear 1206 and the ground ear can be best viewed. As illustrated in FIG. 12C, ground ear 1208 can include an overlapping portion 1214 whose surface area is oriented face clustered pillar 1204*a*. The surface area of overlapping portion 1214 can be oriented with respect to clustered pillar 1204*a*, so as to “wrap around” the clustered pillar 1204*a*. In other words, the overlapping portion 1214 can be configured to maximize the surface area of the ground ear 1208 that is facing the clustered pillar 1204*a*. By orienting the overlapping portion 1214 in this manner, the amount of capacitive coupling between clustered pillar 1204*a* and ground ear 1208 can be maximized.

Signal ear 1206 can also include an overlapping portion 1216 that can be oriented with respect to clustered pillar 1204*b* so as to “wrap around” the clustered pillar 1204*b*. In this way, between ground ear 1208 and overlapping portion 1214, the surface area of the signal ear 1206 that is facing the clustered pillar 1204*b* can be maximized thereby maximizing the capacitive coupling between the clustered pillar 1204*b* and the signal ear 1206.

Figure 13:
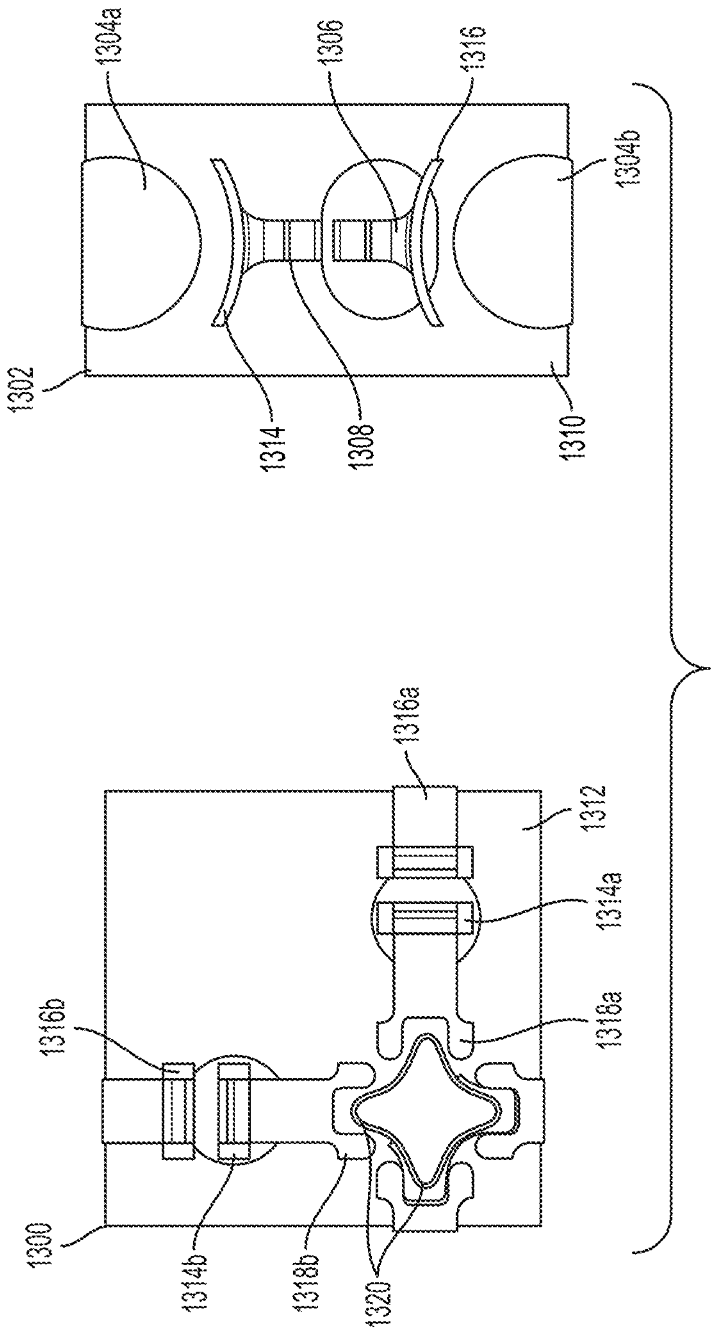
FIG. 13 illustrates a phased array in which the pillars and grounds ears of the radiating elements are integrated into the base plate, and the signal ear is overmolded according to examples of the disclosure.

FIG. 13 illustrates a comparison between the top view of the unit cell described with respect to FIGS. 3A-C, and the top view of the unit cell described with respect to FIGS. 12A-C. As discussed in detail above, with respect to FIGS. 3A-C, unit cell 1300 can include a base plate 1312, a plurality of signal ears 1314*a-b*, a plurality of ground ears 1316*a-b*, and a ground clustered pillar 1320. Also as discussed in detail above, the unit cell 1300 is configured to operate as a dual pole phased array (i.e., the antenna is scanned in two orthogonal coordinate planes).

Also as discussed in detail above, with respect to FIGS. 12A-C, unit cell 1302 can include a base plate 1310, a signal ear 1306, a ground ear 1314, and a ground clustered pillar 1320. Furthermore, as discussed in detail above, the unit cell 1302 is configured to operate as a single pole phased array (i.e., the antenna is scanned along a single coordinate plane).

In comparing unit cell 1300 and unit cell 1302, the differences between the shapes of the ground clustered pillars 1320 and 1304*a-b* can be readily apparent. For example, whereas ground clustered pillar 1320 is cross-shaped to allow for the coupling of elements oriented in two orthogonal positions, the ground clustered pillars 1304*a-b* are cylindrically shaped. Furthermore, the signal ears 1314*a-b* of unit cell 1300 and signal ears 1306 can be shaped differently. With respect to unit cell 1300, the signal ears 1314*a-b* are shaped to create an interdigitated capacitance between each signal ear and one arm of the cross-shaped ground clustered pillar 1320. Specifically, the signal ears 1314*a-b*, contain overlapping portions 1318*a-b* respectively, that are shaped to conform to the shape of the ground clustered pillar 1320, thereby maximizing the surface area of the signal ear that is directly facing the ground clustered pillar.

In comparison, unit cell 1302 includes a signal ear 1306 with overlapping portion 1316 that can be shaped to maximize the surface area that is overlapping (i.e., “wrapping around”) the ground clustered pillar 1304*a* as discussed in detail above. The difference in the shape between ground clustered pillar 1320 and ground clustered pillars 1304*a-b* as well as the difference in the signal ears 1314*a-b* and signal ear 1306 can mean that the capacitive coupling between signal ear 1306 and ground clustered pillar 1304*b* can be greater than the capacitive coupling between ground clustered pillar 1320 and signal ears 1314*a-b* (assuming the gap between the signal ears and the ground clustered pillars are the same).

Since the capacitive coupling is greater for unit cell 1302 as compared to 1300, in order to maintain impedance matching (as discussed above), the gap between the overlapping portion 1316 of signal ear 1306 and the ground clustered pillar 1304*b* can be increased. This is in turn can mean that each unit cell 1302 in a phased array can be further apart from one another. As an example whereas a phased array utilizing a unit cell 1300 may have adjacent unit cells spaced λ/2×λ/2 apart from one another (wherein λ is equal to the maximum wavelength of the desired bandwidth) thereby requiring a 16×16 element array with an aperture of 4.75"×4.75"×0.5", a phased array utilizing a unit cell 1302 may have adjacent unit cells spaced λ/2×0.9λ apart from one another thereby requiring only a 16×8 element array.

The benefits of a phased array design that can maintain aperture size and bandwidth capabilities with less unit cells is readily apparent. Less elements can lower the overall weight of the phased array, while also lowering power requirements and the overall footprint of the phased array.

Overmolding of Radiating Elements

Mechanical failures can be problematic for a phased array antenna, since often times a phased array antenna can be subjected to high vibration environments that can potentially cause adjacent radiating elements to contact the ground clustered pillars or to cause connections between parts of a unit cell to break off or become damaged.

Referring to the example of FIG. 4, and as discussed above, signal ear 416 and ground ear 418 can be assembled to plug 428. Plug 428 may be formed of a dielectric material, such as plastic, in order to maintain the electrical isolation of signal ear 416 from ground ear 418 and base plate 414. As further discussed above, signal ear 416 and ground ear 418 can be inserted into receptacles in plug 428. In some embodiments, plug 428 can be molded around signal ear 416 and ground ear 418 in a process called overmolding. Both the signal and ground ears can be overmolded and then inserted into the phased arrays base plate 414.

While overmolding the signal ear and ground ear in the manner described above can lead to a more efficient manufacturing of the unit cell, overmolding can also introduce a source of potential mechanical failure due to the vibration environment of phased arrays described above. The signal ear and ground ear, by being overmolded can suffer mechanical failure during vibration of the unit cell in the phased array. Furthermore, and as discussed below in detail, when both the signal ear and the ground ear are overmolded, in some embodiments, the ground ear can be press fit to make the required contact with the baseplate of the array. Utilizing a press fit to ensure electrical connection between the ground ear and the base plate can lead to an increased risk of electrical discontinuity between the two components.

Recognizing that the ground ear needs to be connected to the ground, while the signal ear is to be isolated from the ground, instead of overmolding both the ground ear and the signal ear, if one or more of the radiating elements can be directly connected to elements with the base plate 414, the risk of mechanical and electrical failure of the array can be decreased. For instance while the signal ear can be overmolded and inserted into the base plate (in order to achieve the necessary electrical isolation)

Figure 14B:
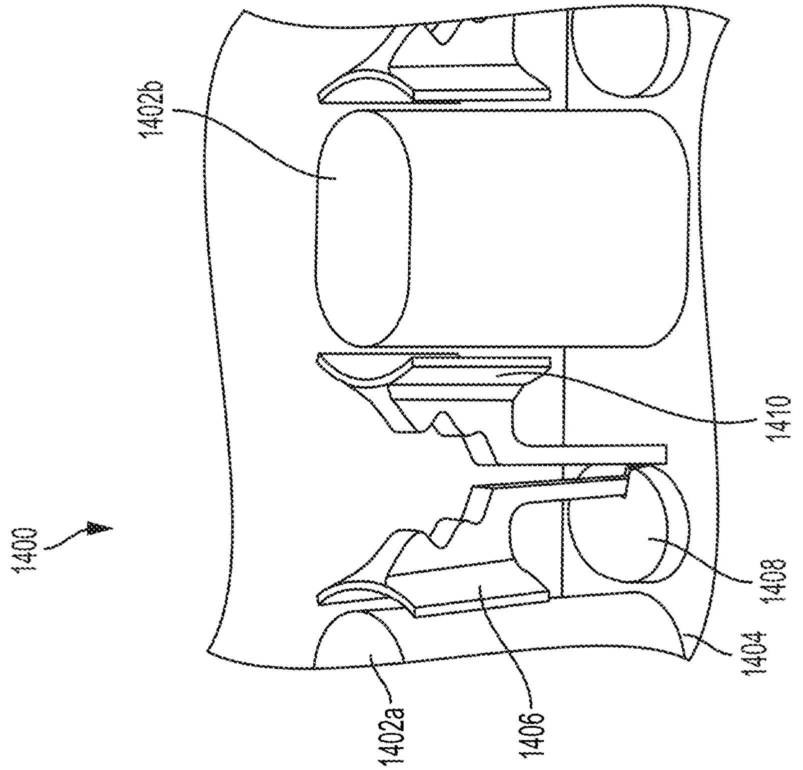
FIG. 14B illustrates another view of the element and baseplate of the phased array depicted in FIG. 14A.
Figure 14A:
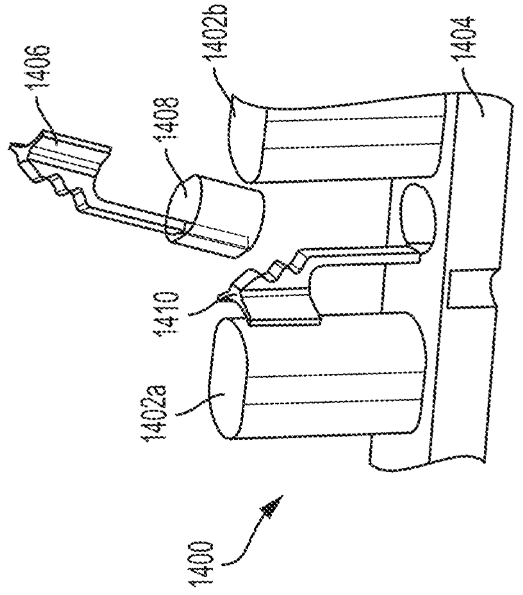
FIG. 14A illustrates an element and baseplate of the phased array configured to be mated with an elastomeric gasket that delivers signal and ground to a coaxial connector or PCB according to examples of the disclosure.

FIGS. 14A-B illustrate a phased array in which the pillars and grounds ears of the radiating elements are integrated into the base plate, and the signal ear is overmolded according to examples of the disclosure. Turning to FIG. 14A, the unit cell 1400 can include the same components as described above with respect to FIGS. 12A-C. Unit cell 1400 can include base plate 1404, ground clustered pillar 1402A-B, ground ear 1410, and signal ear 1406. These components can operate in substantially the same way as their counterparts described with respects to FIGS. 12A-C. As shown in the example of FIG. 14, the signal ear 1406 can be overmolded and fit into plug 1408. Plug 1408, with the signal ear 1406 inserted into it, can be plugged into the base plate 1404. Ground ear 1410 can be directly connected to the base plate 1404. In contrast to the example described with respect to FIGS. 4A-B, wherein both the signal ear 416 and the ground ear 418 are overmolded into plug 428, in the example of FIGS. 14A-B, only the signal ear 1406 may be overmolded into plug 1408, while ground ear 1410 can be connected directly to the base plate 1404.

In this way, the ground ear 1410 can be directly connected to ground (since as described above the base plate 1404 is grounded), while the signal ear 1406 can be electrically isolated from the base plate components via the plug 1408. The signal ear 1406 can be electrically isolated from the base plate 1404 via the plug 1408, because just as the plug 428 in the example of FIGS. 4A-B, the plug 1408 may be formed of a dielectric material, such as plastic, in order to maintain the electrical isolation of signal ear 1406 from ground ear 1410 and base plate 1404. Plug 1408 may be formed from various plastics such as ABS, Nylon, PA, PBT, PC, PEEK, PEK, PET, Polyimides, POM, PPS, PPO, PSU, or UHMWPE. In some embodiments the plug 1408 can be formed for polyethermide (PEI), a high-performance, high-temperature plastic, that can achieve the required impedance matching to maintain the performance of the phased array. FIG. 14A illustrates the unit cell 1400 with the signal ear 1406 and plug 1408 detached from the unit cell. FIG. 14B illustrates the same unit cell with the plug 1408 "plugged in" to the base plate 1404.

The ground ear 1410 can be integrated into the base plate 1404 by utilizing a two-step machining process according to examples of the disclosure. The first step can include utilizing computer numerical control (CNC) milling to remove material from an aluminum piece so as to form the base plate and ground ear out of a single block of metal. The second step can include utilizing wire electrical discharge machining (wire EDM) to finely carve out the remaining ground ear features that are too fine to be carved out by the milling process.

By overmolding only the signal ear 1406, and connecting the ground ear 1410 directly to the base plate 1404, the number of locations for possible mechanical failure (e.g., electrical discontinuity) can be reduced since less components are susceptible to the mechanical risks associated with attaching components via overmolding.

Flexible Connectors

While reducing the number of components of a unit that are inserted into the base plate via overmolding can reduce the risk of mechanical failure during the operation or deployments of a phased array antenna, the connections between the unit cells of the phased array and any downstream electronics can present a risk of mechanical failure, especially in a high vibration environment.

Figure 15:
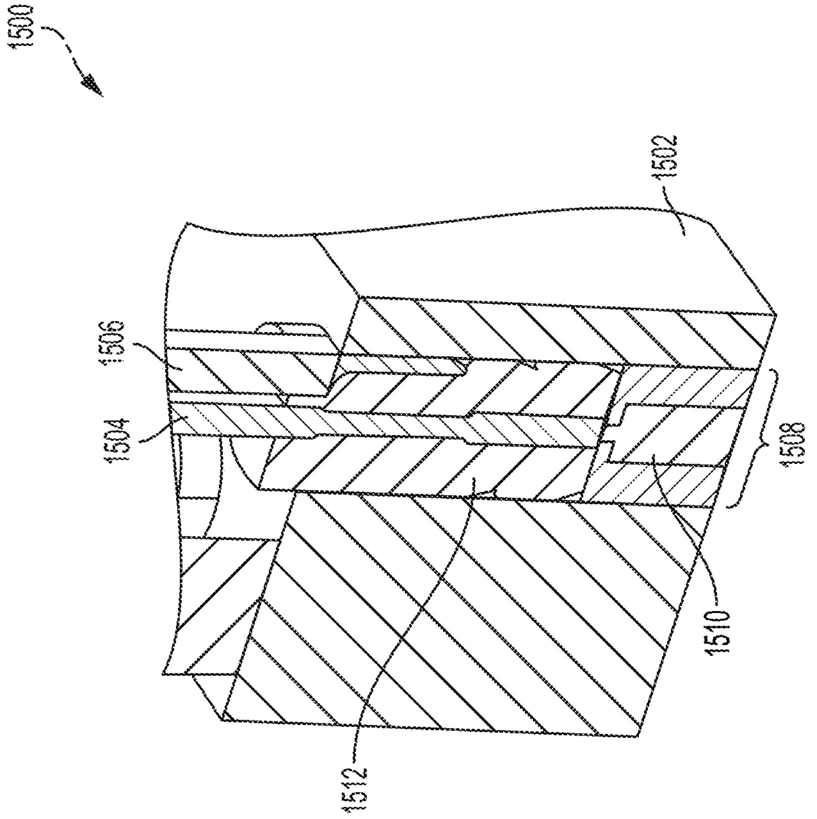
FIG. 15 illustrates the feeding structure of the radiating element in the baseplate of the phased array configured to be mated with a coaxial connector according to examples of the disclosure.

FIG. 15 illustrates an exemplary feeding structure of the radiating element in the baseplate of the phased array configured to be mated with a coaxial connector according to examples of the disclosure.

FIG. 15 illustrates a cross-section of a unit cell 1500 wherein the connection between a signal ear 1506 and a SMA connector 1508 is visible. Similar to the examples discussed above, signal ear 1504 can be connected to the unit cell 1500 via plug 1512 and provide an electrically isolated path for the signal ear 1506 to make electrical contact with SMA connector 1508. SMA connector 1508 can include a conductive portion 1510 that when contacted by signal ear 1504, can provide a closed electrical connection between the signal ear and any downstream electronics connected to the co-axial cable associated with the SMA connector.

While the connection between the signal ear 1504 and the SMA connector 1508 can generally be maintained during normal operation of the phased array, the antenna array may be subject to vibration as described above. During vibration the connection between SMA connector 1508 and signal ear 1504 may become loose or may become disconnected entirely thereby negatively impacting the performance of the phased array. Since the signal ear 1504 and the conductive portion 1510 of SMA connector 1508 are both made of rigid metal material, they can be especially susceptible to an interruption of connection caused by vibration.

Since rigid connections between conductive elements may be susceptible to mechanical failure especially in environments that experience vibration such as the environment that a phased array may operate or be deployed, flexible connectors may provide improved reliability and reduce the risk of mechanical failure of the connection. For example, flexible connectors can dampen vibration, which in turn can improve the overall mechanical reliability of electrical connections in the phased array.

Thus, rather than relying on direct contact between the rigid bodies of the signal ear 1504 and the conductive portion 1510 of SMA connector 1508, and intervening flexible connector may provide a more reliable solution that is less prone to mechanical failure.

As an example, rather than directly connecting the signal ear 1504 with SMA connector 1508, an intervening flexible connector that can withstand a vibration environment can be employed to reduce the risk of mechanical failure of the connection in a vibration environment.

A Zebra® connector designed by Fujipoly is an example of an elastomeric connector that can be employed to reduce the risk of mechanical failure. A Zebra connector can include alternating and insulating regions in a rubber or elastomer matrix that can configure to produce overall anisotropic conductive properties. Because of their flexibility, Zebra connectors can create a gasket-like seal between rigid connections and can excel in shock and anti-vibration applications owing to the flexibility of the connector. The conductive material in a Zebra connector can include carbon, silver, and gold.

Figure 16B:
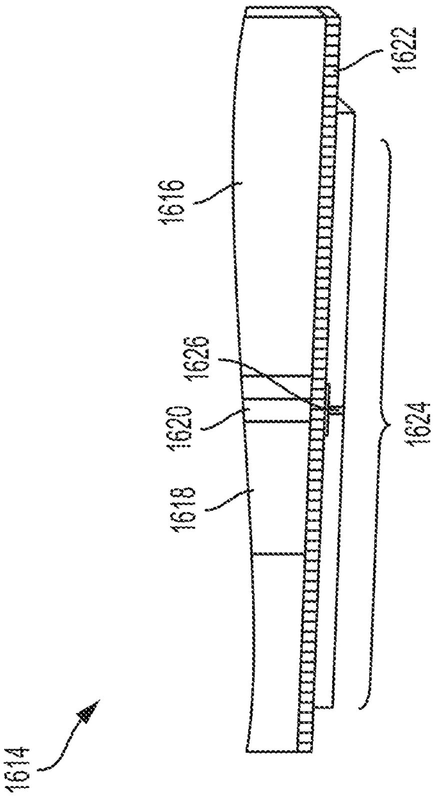
FIG. 16B illustrates an exemplary connection between a signal ear and a printed circuit board (PCB) that employs an elastomeric connector according to examples of the disclosure.
Figure 16A:
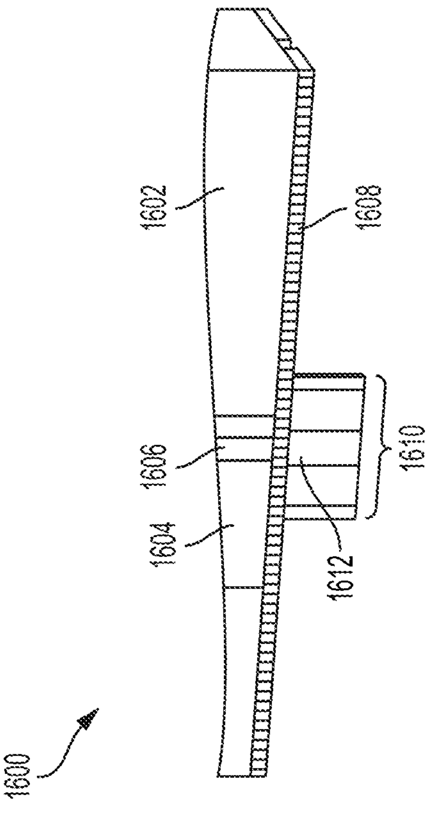
FIG. 16A illustrates an exemplary feeding structure of a radiating element in the baseplate of the phased array configured to be mated with an elastomeric gasket according to examples of the disclosure.

FIGS. 16A-B illustrate an exemplary feeding structure of a radiating element in the baseplate of the phased array configured to be mated with an elastomeric gasket according to examples of the disclosure. FIG. 16A illustrates an exemplary connection between a signal ear and a co-axial cable employing a SMA connector that employs an elastomeric connector according to examples of the disclosure. Similar to the example of FIG. 15, in FIG. 16A, a unit cell 1600 can include a base plate 1602, a signal ear 1606 that is overmolded into a plug 1604. The plug 1604 can electrically isolate the signal ear 1606 from the base plate 1602, and can allow the signal ear to extend down into the base plate to make an electrical connection to SMA connector 1610. SMA connector can include a conductive portion 1612. In contrast to the example of FIG. 15, in the example of FIG. 16A, rather than directly connecting the signal ear 1606 to the conductive portion 1612 of the SMA connector 1610, an elastomeric conductor 1608 can be inserted between the signal ear 1606 and SMA connector 1610. The elastomeric conductor 1608, as described above can provide a flexible conductive pathway between the signal ear 1606 and the conductive portion 1612 of SMA connector 1610.

FIG. 16B illustrates an exemplary connection between a signal ear and a printed circuit board (PCB) that employs an elastomeric connector according to examples of the disclosure. As illustrated in FIG. 16B, PCB connections can allow for a high-density spacing of connections in contrast to RF connectors. The unit cell 1614 of FIG. 16B can include the same components as the example of FIG. 16A including a base plate 1616, plug 1618, signal ear 1620 and an elastomeric connector 1622 that all are configured to operate identically to their counterparts discussed above. In the example of FIG. 16B, rather than connecting to a co-axial cable, the signal ear can be connected to a PCB circuit 1624 that can include a connector 1626. Connector 1626 can make electrical contact with elastomeric connector 1622, which can then complete an electrical path between the signal ear 1620 and the PCB circuit 1624.

Figure 17:
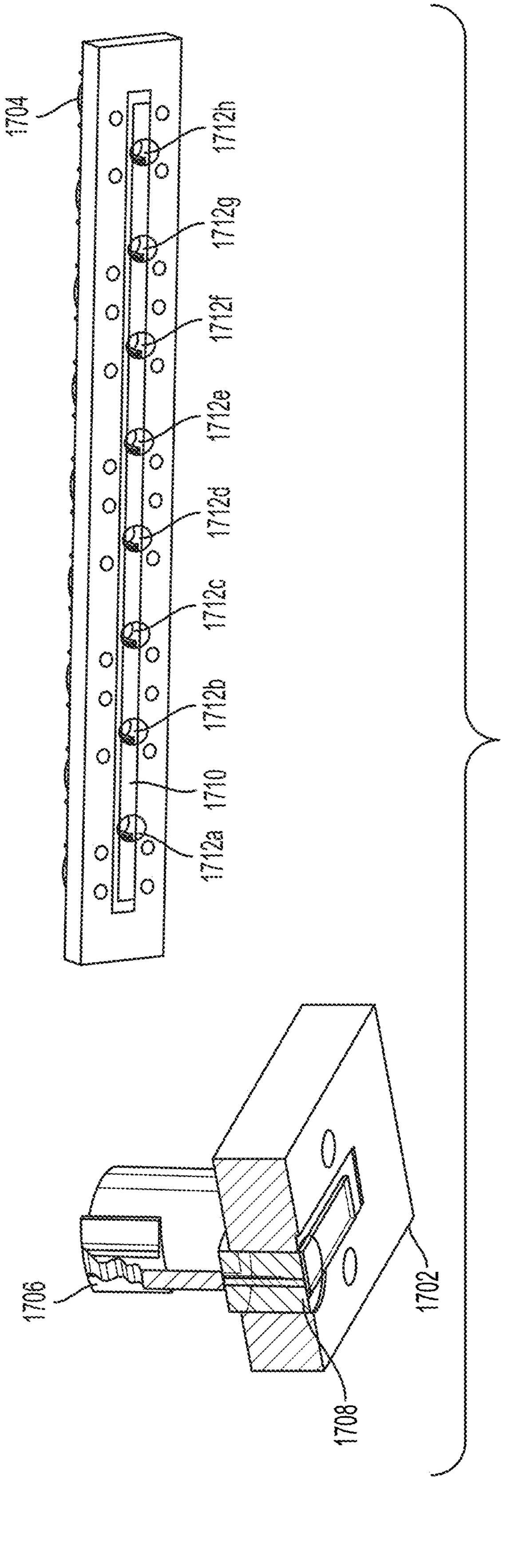
FIG. 17 illustrates an embodiment of the interface at the bottom to install the elastomeric gasket according to examples of the disclosure.

FIG. 17 illustrates a plurality of unit cells with a common elastomeric connector according to examples of the disclosure. FIG. 17 illustrates a view underneath one unit cell 1702, and a view from underneath a plurality of unit cells 1704. As shown in the figure, a elastomeric connector strip can be disposed underneath the unit cell 1702 such that it can make contact with the stem of signal ear 1706 that can protrude underneath plug 1708. Turning to the plurality of unit cells 1704, an elastomeric strip 1710 can be disposed underneath the plurality of unit cells 1704 such that the elastomeric strip can make contact with a plurality of signal ear holes 1712*a-h*. Each signal ear hole 1712*a-h* can receive a signal ear (inserted into a plug) such that when the signal ear is plugged into the hole 1712, the stem of the signal ear can make contact with elastomeric strip 1710.

In additional embodiments of the disclosure, instead of employing an elastomeric connector, the unit cell can employ a RF interposer such as a Fuzz Button® connector that can connect an SMA connector or PCB circuit Board. Fuzz Buttons® are compressible contact pins made up of higly specialized very fine wire that can be would up into a cylinder of customizable size. A Fuzz Button® connector, in which the conductive element that conducts a signal between two electrical connections, can employ a spring-like connector that can withstand a high-vibration environment while minimizing the risk of mechanical failure in much the same way as an elastomeric connector can. Fuzz Buttons® can be employed to make contacts for the phased array due to its small size (the small size allows them to fit in available spacing). They are flexible connectros that can ensure a good electrical connection, while remaining versatile enough to be used with either an SMA or PCB connector. Because they are highly conductive, they can preserve signal integrity. Furthermore Fuzz Buttons® have been verified to operate at the operational frequencies used by the phased array and detailed above.

Figure 18B:
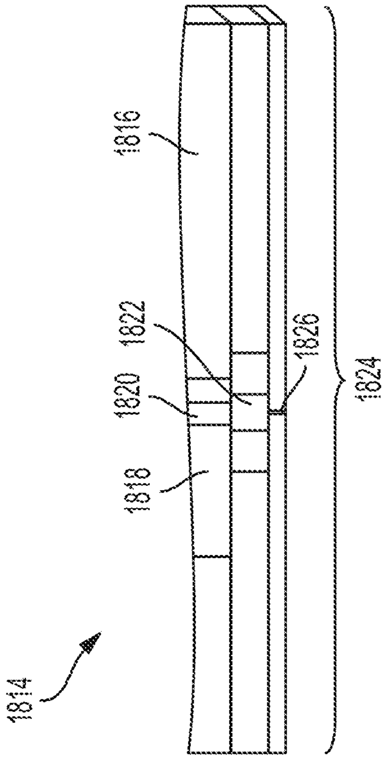
FIG. 18B illustrates an exemplary RF interconnect with a PCB according to examples of the disclosure.
Figure 18A:
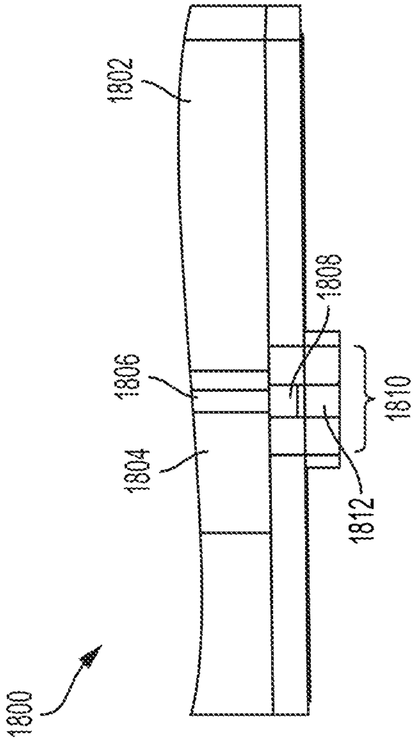
FIG. 18A illustrates an exemplary RF interconnect with a coaxial cable according to examples of the disclosure.

FIG. 18A illustrates an exemplary connection between a signal ear and a co-axial cable employing a SMA connector that employs a Fuzz Button® RF interposer according to examples of the disclosure. Similar to the example of FIG. 15, in FIG. 18A, a unit cell 1800 can include a base plate 1802, a signal ear 1806 that is overmolded into a plug 1804. The plug 1804 can electrically isolate the signal ear 1806 from the base plate 1802, and can allow the signal ear to extend down into the base plate to make an electrical connection to SMA connector 1810. SMA connector can include a conductive portion 1812. In contrast to the example of FIG. 18, in the example of FIG. 18A, rather than directly connecting the signal ear 1806 to the conductive portion 1812 of the SMA connector 1610, a Fuzz Button® connector 1808 can be inserted between the signal ear 1806 and SMA connector 1810. The Fuzz Button® connector 1808, as described above can provide a flexible conductive pathway between the signal ear 1806 and the conductive portion 1812 of SMA connector 1810.

FIG. 18B illustrates an exemplary connection between a signal ear and a printed circuit board (PCB) that employs a Fuzz Button® connector according to examples of the disclosure. The unit cell 1814 of FIG. 18B can include the same components as the example of FIG. 18A including a base plate 1816, plug 1818, signal ear 1820 and an Fuzz Button® connector 1822 that all are configured to operate identically to their counterparts discussed above. In the example of FIG. 16B, rather than connecting to a co-axial cable, the signal ear can be connected to a PCB circuit 1824 that can include a Fuzz Button® connector 1826. Fuzz Button® connector 1826 can make electrical contact with Fuzz Button® connector 1822, which can then complete an electrical path between the signal ear 1820 and the PCB circuit 1824.

In accordance with the foregoing, frequency scaled ultra-wide spectrum phased array antennas can provide wide bandwidth, wide scan volume, and good polarization, in a low loss, lightweight, low profile design that is easy to manufacture. The unit cells may be scalable and may be combined into an array of any dimension to meet desired antenna performance. One of skill in the art can appreciate that employing a PCB circuit rather than an coaxial cable to connect with the signal can allow for the entire array to be excited using a PCB combiner.

Phased array antennas, according to some embodiments, may reduce the number of antennas which need to be implemented a given application by providing a single antenna that serves multiple systems. In reducing the number of required antennas, embodiments of the present invention may provide a smaller size, lighter weight alternative to conventional, multiple-antenna systems resulting in lower cost, less overall weight, and reduce aperture.

According to some examples of the disclosure, a phased array antenna can include a base plate, a first ground clustered pillar projecting from the base plate; a second ground clustered pillar projecting from the base plate and spaced apart from a first side of the first ground clustered pillar, a first ground member projecting from the base plate between the first ground clustered pillar and the second ground clustered pillar, wherein a distal end of the first ground member is configured to capacitively couple to the second ground clustered pillar; and a first signal member projecting from the base plate between the first ground clustered pillar and the first ground member, wherein a distal end of the first signal member is configured to capacitively couple to the first ground clustered pillar, and wherein a shape of the first signal member and a shape of the first ground clustered pillar are configured so that a distance between each adjacent unit cell of the plurality of unit cells of the phased array is greater than one half of a maximum operating wavelength of the phased array. In one or more examples, the first signal member is inserted into the base plate and is connected to a flexible conductor on a first side of the flexible conductor. In one or more examples, the flexible conductor is connected to a rigid conductor on a second side of the flexible conductor, and wherein the first signal ear. In one or more examples, the flexible conductor is connected to a rigid conductor on a second side of the flexible conductor. In one or more examples, the first signal ear, the flexible conductor, and the rigid conductor are configured to create an electrical path between the first signal ear and the rigid connector. In one or more examples, the flexible conductor is an elastomeric conductor. In one or more examples, the elastomeric conductor is a Fujipoly Zebra connector. In one or more examples, the flexible conductor is a fuzz button connector. In one or more examples, the first signal member is overmolded into a plug, and wherein the plug electrically isolates the first signal ear from the first ground ear and the base plate. In one or more examples, the plug with the inserted first signal member is inserted into the base plate.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A phased array antenna comprising:

a base plate;

a ground member projecting from the base plate; and a signal member projecting from the base plate adjacent to the ground member, wherein the signal member is inserted into the base plate and is connected to a flexible conductor on a first side of the flexible conductor, wherein the flexible conductor is connected to a rigid conductor of a connector on a second side of the flexible conductor, and wherein the signal member, the flexible conductor, and the rigid conductor are configured to create an electrical path between the signal member and the connector.

2. The phased array antenna of claim 1, wherein the flexible conductor is an elastomeric conductor.

3. The phased array antenna of claim 2, wherein the elastomeric conductor comprises an elastomer matrix.

4. The phased array antenna of claim 1, wherein the flexible conductor comprises a compressible contact pin.

5. The phased array antenna of claim 2, wherein the connector is a SubMiniature Version A (SMA) connector.

6. The phased array antenna of claim 2, wherein the connector is a printed circuit board (PCB) connector.

7. The phased array antenna of claim 1, comprising a first ground clustered pillar projecting from the base plate on a first side of the ground member.

8. The phased array antenna of claim 7, comprising a second ground clustered pillar projecting from the base plate on a second side of the ground member.

9. The phased array antenna of claim 7, wherein the signal member is positioned between the ground member and the first ground clustered pillar.

10. The phased array antenna of claim 7, wherein the ground clustered pillar is formed into a cross-like shape and wherein one or more edges of at least one of the signal member and the ground member are shaped to encapsulate an edge of the ground clustered pillar.

11. The phased array antenna of claim 1 wherein the signal member and ground member form a radiating element, and the phased array antenna comprises an array of radiating elements.

12. The phased array antenna of claim 11, wherein the array of radiating elements comprises a first set of radiating elements arranged in a first orientation and a second set of radiating elements arranged in a second orientation orthogonal to the first orientation.

13. The phased array antenna of claim 1, wherein the ground member is electrically connected to the base plate and the signal member is electrically isolated from the base plate.

14. The phased array antenna of claim 1, wherein the signal member is inserted into the base plate via a plug made from dielectric material.

15. The phased array antenna of claim 1, wherein the flexible conductor comprises a strip of conductive material extending along at least a portion of a bottom of the base plate.

* * * * *